(12) United States Patent
Sun et al.

(10) Patent No.: US 12,267,833 B2
(45) Date of Patent: Apr. 1, 2025

(54) METHOD AND DEVICE FOR RECEIVING PHYSICAL DOWNLINK CONTROL CHANNEL

(71) Applicant: Samsung Electronics Co., Ltd., Gyeonggi-do (KR)

(72) Inventors: Feifei Sun, Beijing (CN); Yi Wang, Beijing (CN); Jingxing Fu, Beijing (CN); Min Wu, Beijing (CN)

(73) Assignee: Samsung Electronics Co., Ltd (KR)

( * ) Notice: Subject to any disclaimer, the term of this patent is extended or adjusted under 35 U.S.C. 154(b) by 455 days.

(21) Appl. No.: 17/628,712

(22) PCT Filed: Jul. 24, 2020

(86) PCT No.: PCT/KR2020/009822
§ 371 (c)(1),
(2) Date: Jan. 20, 2022

(87) PCT Pub. No.: WO2021/020826
PCT Pub. Date: Feb. 4, 2021

(65) Prior Publication Data

US 2022/0272732 A1    Aug. 25, 2022

(30) Foreign Application Priority Data

Jul. 26, 2019    (CN) .......................... 201910683074.2
Nov. 12, 2019    (CN) .......................... 201911101906.1

(51) Int. Cl.
*H04W 72/1273*    (2023.01)
*H04W 24/08*    (2009.01)
(Continued)

(52) U.S. Cl.
CPC ....... *H04W 72/1273* (2013.01); *H04W 24/08* (2013.01); *H04W 72/0446* (2013.01); *H04W 72/0453* (2013.01); *H04W 72/23* (2023.01)

(58) Field of Classification Search
CPC ............. H04W 72/1273; H04W 72/23; H04W 72/0446; H04W 72/0453; H04W 24/08
See application file for complete search history.

(56) References Cited

U.S. PATENT DOCUMENTS 11,134,500 B2    9/2021    Ji et al.
11,924,834 B2 *  3/2024    Zhang ....................... H04L 1/08
(Continued)

FOREIGN PATENT DOCUMENTS

CN           107241920         10/2017
WO      WO 2017/192014        11/2017
(Continued)

OTHER PUBLICATIONS

European Search Report dated Jun. 20, 2023 issued in counterpart application No. 20847020.3-1203, 6 pages.
(Continued)

*Primary Examiner* — Blake J Rubin
(74) *Attorney, Agent, or Firm* — The Farrell Law Firm, P.C.

(57) ABSTRACT

The present disclosure relates to a communication method and system for converging a $5^{th}$-Generation (5G) communication system for supporting higher data rates beyond a $4^{th}$-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. The present disclosure provides a method and device for receiving a physical downlink control channel in a wireless communication network, and method and device for determining resources.

20 Claims, 24 Drawing Sheets

(51) Int. Cl.
*H04W 72/0446* (2023.01)
*H04W 72/0453* (2023.01)
*H04W 72/23* (2023.01)

(56) References Cited

U.S. PATENT DOCUMENTS

| | | | |
|---|---|---|---|
| 2012/0320840 A1 | 12/2012 | Kim et al. | |
| 2013/0114529 A1 | 5/2013 | Chen et al. | |
| 2016/0219607 A1* | 7/2016 | You | H04W 72/12 |
| 2016/0269939 A1 | 9/2016 | Papasakellariou | |
| 2017/0013391 A1* | 1/2017 | Rico Alvarino | H04W 72/0446 |
| 2017/0086179 A1 | 3/2017 | Oizumi et al. | |
| 2018/0007667 A1* | 1/2018 | You | H04L 5/0051 |
| 2019/0082448 A1 | 3/2019 | Nogami et al. | |
| 2020/0068591 A1* | 2/2020 | Xu | H04L 5/0053 |
| 2020/0169446 A1 | 5/2020 | Chen et al. | |
| 2021/0067268 A1* | 3/2021 | Seo | H04L 25/0238 |
| 2021/0144720 A1* | 5/2021 | Xu | H04L 5/0051 |
| 2021/0168781 A1* | 6/2021 | Lee | H04W 72/23 |
| 2021/0250928 A1* | 8/2021 | Seo | H04L 5/001 |
| 2021/0314045 A1* | 10/2021 | Cha | H04W 16/28 |
| 2021/0385826 A1* | 12/2021 | Moon | H04L 1/00 |
| 2022/0077969 A1* | 3/2022 | Kim | H04L 1/1861 |
| 2022/0132341 A1* | 4/2022 | Lee | H04W 24/08 |
| 2022/0141690 A1* | 5/2022 | Wu | H04L 5/0094 370/329 |
| 2022/0191789 A1* | 6/2022 | Reial | H04W 48/12 |
| 2022/0271817 A1* | 8/2022 | Lee | H04B 17/336 |

FOREIGN PATENT DOCUMENTS

| | | |
|---|---|---|
| WO | WO 2018/184470 | 10/2018 |
| WO | WO 2018/204282 | 11/2018 |
| WO | WO 2018/233587 | 12/2018 |
| WO | WO 2019/028796 | 2/2019 |
| WO | WO 2019/029528 | 2/2019 |
| WO | WO 2019/139955 | 7/2019 |
| WO | WO 2021/245624 | 12/2021 |

OTHER PUBLICATIONS

European Search Report dated Feb. 27, 2023 issued in counterpart application No. 22206833.0-1213, 6 pages.
PCT/ISA/210 Search Report issued on PCT/KR2020/009822, Oct. 26, 2020, pp. 3.
PCT/ISA/237 Written Opinion issued on PCT/KR2020/009822, Oct. 26, 2020, pp. 4.
Hua Zhang et al., "Physical Downlink Control Channel for Beyond LTE-Advanced", Procedia Computer Science 131, May 11, 2018, 8 pages.
European Search Report dated Jul. 6, 2022 Issued in counterpart application No. 20847020.3-1203, 9 pages.
Intel Corporation, "Enhancements to HARQ for NR-Unlicensed", R1-1912199, 3GPP TSG RAN WG1 Meeting #99, Nov. 18-22, 2019, 13 pages.
Bo Yang, "Study on Retransmission Performance of NB-IoT", Modern Information Technology, vol. 2, No. 4, Apr. 2018, 3 pages.
Chen Jiang et al., "The Design of Transport Block-based ROHC U-Mode for LTE Multicast", 2018, 6 pages.
Chinese Office Action dated Apr. 25, 2024 issued in counterpart application No. 201910683074.2, 15 pages.
Chinese Office Action dated Jun. 6, 2024 issued in counterpart application No. 201911101906.1, 27 pages.
EP Summons to Attend Oral Proceedings dated Sep. 10, 2024 issued in counterpart application No. 20847020.3-1203, 7 pages.

* cited by examiner

METHOD AND DEVICE FOR RECEIVING PHYSICAL DOWNLINK CONTROL CHANNEL

PRIORITY

This application is a National Phase Entry of PCT International Application No. PCT/KR2020/009822, which was filed on Jul. 24, 2020, and claims priority to Chinese Patent Application Nos. 201910683074.2 and 201911101906.1, which were filed on Jul. 26, 2019, and Nov. 12, 2019, respectively, the entire content of each of which is incorporated herein by reference.

TECHNICAL FIELD

The present disclosure relates to the technical field of wireless communication, and more specifically, to a method and device for receiving a physical downlink control channel in a wireless communication network, and in particular, to a method and device for determining resources.

BACKGROUND ART

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

New Radio (NR) systems mostly use higher frequency points than Long Term Evolution (LTE). However, due to the high deployment cost of base stations, operator systems can achieve a coverage performance of the NR system equivalent to that of the LTE system, so that NR base station devices can be directly upgraded or deployed on original LTE sites.

DISCLOSURE OF INVENTION

Technical Problem

For Internet of things (IOT) UEs like a machine-type control (MTC) user equipment (UE) and narrow-band Internet of things (NB-IOT), due to their special application scenarios, requirements on battery life and cost of battery are relatively high. When designing a system, this type of UE shall be designed to have features of smaller operating bandwidth, fewer transceiver antennas, etc. than ordinary UEs that support broadband services. In addition, this type of UE (such as, IOT devices in basements) may have worse coverage than the ordinary UEs that support broadband services. In order to ensure that this type of UE achieves basically the same coverage as the ordinary UEs that support broadband services, the existing uplink and downlink signals/channels need to be enhanced.

In an NR system, one transmission (or repetition) of a transport block (TB) occupies all or part of the symbols in a slot in time domain, and occupies one or more physical resource block (PRB) in frequency domain. However, since uplink is a power-limited system, the coverage enhancement effect cannot be achieved even if more PRBs are allocated. On the contrary, the time for uplink transmission should be prolonged as much as possible. Although NR now supports repetitions, because current unit for time domain resource scheduling in NR is one time slot at most, when the number of PRBs occupied in the frequency domain is small, transmission of a TB across multiple slots cannot be supported. Compared with a transmission with a lower bit rate (a TB across multiple slots), although the current system supports a redundancy version (RV) rotation method to improve performance, when the bit rate is too high, the performance is still limited.

In addition, for a transmission at higher frequency, such as larger than 52.6 GHz, a larger subcarrier spacing, such as several hundreds kHz, is needed. Then, it will lead to a slot to be very short. In this way, in order to satisfy uplink coverage requirement, a longer transmission time is needed.

Solution to Problem

The present disclosure is proposed to enhance a physical downlink control channel (PDCCH) to improve the coverage of the PDCCH.

According to a first aspect of the present disclosure, a method for receiving a physical downlink control channel (PDCCH) includes: receiving configuration information of the PDCCH; determining a resource mapping from a control channel element (CCE) of the PDCCH to one or a plurality of search space (SS) regions based on the configuration information; and receiving the PDCCH based on the resource mapping.

In an exemplary embodiment, the method may further include: determining, based on the configuration information, at least one of: a mapping from a resource element group (REG) to the CCE, a mapping from a PDCCH candidate to the SS regions, and information indicating whether precoders or beams in the plurality of SS regions are identical.

In an exemplary embodiment, the plurality of SS regions may form one SS-bundle and a plurality of CCEs of one PDCCH may be mapped to a plurality of SS regions belonging to a same SS-bundle.

In an exemplary embodiment, the plurality of SS regions forming one SS-bundle may belong to a same SS, or belong to different SSs.

In an exemplary embodiment, the plurality of SS regions forming one SS-bundle may belong to a same SS period, and a size of each SS-bundle is same or different; wherein, where the size of each SS-bundle is the same, the number of SS regions in each SS period is an integer multiple of the size of each SS-bundle.

In an exemplary embodiment, the plurality of SS regions forming one SS-bundle may have a predetermined time interval between each other.

In an exemplary embodiment, the plurality of SS regions forming one SS-bundle may be determined by information on semi-statically configured time resource.

In an exemplary embodiment, PDCCH monitoring may be performed on the plurality of SS regions forming one SS-bundle; PDCCH monitoring is not performed on a resource indicated as a non-downlink symbol in the plurality of SS regions forming one SS-bundle; or PDCCH monitoring is performed on the plurality of SS regions forming one SS-bundle with an assumption that there is no PDCCH signal on a resource indicated as a non-downlink symbol in the plurality of SS regions forming one SS-bundle.

In an exemplary embodiment, the SS-bundle may be formed by a plurality of valid SS regions, where all symbols are semi-statically configured as downlink symbols or SS regions indicated by a slot format indicator (SFI) as downlink symbols are the valid SS regions.

In an exemplary embodiment, for a first type of SS, the SS regions of the SS-bundle may be determined based on the semi-statically configured SS regions; and for a second type of SS, the SS regions of the SS-bundle may be determined based on the semi-statically configured time resource and the slot format indicator (SFI).

In an exemplary embodiment, the resource mapping determined based on the configuration information may indicate that all REGs of any CCE of one PDCCH are mapped to a same SS region, and at least two CCEs of one PDCCH are mapped to different SS regions in one SS-bundle.

In an exemplary embodiment, mapping the at least two CCEs of one PDCCH to different SS regions in one SS-bundle may include: sending, in the different SS regions, CCEs that are identical repeated samples.

In an exemplary embodiment, the resource mapping determined based on the configuration information may indicate that a plurality of REGs of one CCE of one PDCCH are mapped to a plurality of SS regions in one SS-bundle, and a plurality of CCEs of one PDCCH are mapped to the plurality of SS regions in one SS-bundle.

In an exemplary embodiment, the number of OFDM symbols corresponding to the plurality of SS regions in one SS-bundle may be an integer multiple of the number of resource element groups REG included in one CCE, or an integer multiple of a size of a REG bundle.

In an exemplary embodiment, the method may further include: determining a reference time and a slot offset based on the received PDCCH; and receiving a physical downlink shared channel (PDSCH) based on the reference time and the slot offset, where, the reference time is one of a starting point of a slot where a last symbol of the last PDCCH repetition in time domain is located, a starting point or an ending point of a slot where a last symbol of a PDCCH candidate determined based on a maximum number of repetitions is located, or an ending position of a last symbol of the last PDCCH repetition in time domain or an ending position of a first symbol of the last PDCCH repetition in time domain.

According to a second aspect of the present disclosure, a communication device may include a processor and a memory, wherein the memory stores instructions, the instructions, when executed by the processor, the processor performs the above method.

According to a third aspect of the present disclosure, a method for sending a physical downlink control channel (PDCCH) includes: sending configuration information of the PDCCH, wherein the configuration information can be used to determine a resource mapping from a control channel element (CCE) of the PDCCH to one or a plurality of search space (SS) regions; and sending the PDCCH based on the resource mapping determined from the configuration information.

In an exemplary embodiment, the configuration information can also be used to determine at least one of: a mapping from a resource element group (REG) to the CCE, a mapping from a PDCCH candidate to the SS regions, and information indicating whether precoders or beams in the plurality of SS regions are identical.

In an exemplary embodiment, the plurality of SS regions may form one SS-bundle and a plurality of CCEs of one PDCCH may be mapped to a plurality of SS regions belonging to a same SS-bundle.

In an exemplary embodiment, the plurality of SS regions forming one SS-bundle may belong to a same SS, or belong to different SSs.

In an exemplary embodiment, the plurality of SS regions forming one SS-bundle may belong to a same SS period, and a size of each SS-bundle is same or different; wherein, where the size of each SS-bundle is the same, the number of SS regions in each SS period is an integer multiple of the size of each SS-bundle.

In an exemplary embodiment, the plurality of SS regions forming one SS-bundle may have a predetermined time interval between each other.

In an exemplary embodiment, the plurality of SS regions forming one SS-bundle may be determined by information on semi-statically configured time resource.

In an exemplary embodiment, the SS-bundle may be formed by a plurality of valid SS regions, where all symbols are semi-statically configured as downlink symbols or SS regions indicated by a slot format indicator (SFI) as downlink symbols are the valid SS regions.

In an exemplary embodiment, for a first type of SS, the SS regions of the SS-bundle may be determined based on the semi-statically configured SS regions; and for a second type of SS, the SS regions of the SS-bundle may be determined based on the semi-statically configured time resource and the slot format indicator (SFI).

In an exemplary embodiment, the resource mapping determined based on the configuration information may indicate that all REGs of any CCE of one PDCCH are mapped to a same SS region, and at least two CCEs of one PDCCH are mapped to different SS regions in one SS-bundle.

In an exemplary embodiment, mapping the at least two CCEs of one PDCCH to different SS regions in one SS-bundle may include: sending, in the different SS regions, CCEs that are identical repeated samples.

In an exemplary embodiment, the resource mapping determined based on the configuration information may indicate that a plurality of REGs of one CCE of one PDCCH are mapped to a plurality of SS regions in one SS-bundle, and a plurality of CCEs of one PDCCH are mapped to the plurality of SS regions in one SS-bundle.

In an exemplary embodiment, the number of OFDM symbols corresponding to the plurality of SS regions in one SS-bundle may be an integer multiple of the number of resource element groups REG included in one CCE, or an integer multiple of a size of a REG bundle.

In an exemplary embodiment, the method may further include: sending the physical downlink shared channel (PDSCH) based on a reference time and a slot offset determined based on the PDCCH, where, the reference time is one of a starting point of a slot where a last symbol of the last PDCCH repetition in time domain is located, a starting point or an ending point of a slot where a last symbol of a PDCCH candidate determined based on a maximum number of repetitions is located, or an ending position of a last symbol of the last PDCCH repetition in time domain or an ending position of a first symbol of the last PDCCH repetition in time domain.

According to a fourth aspect of the present disclosure, a communication device may include a processor and a memory, wherein the memory stores instructions, the instructions, when executed by the processor, the processor performs the above method.

According to a fifth aspect of the present disclosure, a computer readable storage medium is provided, wherein the medium stores instructions executable by a processor to implement the above method.

In a sixth aspect, the present application provides a method for determining a resource, applied to a UE, comprising:
  receiving resource allocation information;
  determining, according to the resource allocation information, time domain resource position occupied by one transmission of one transport block and/or a total symbol length occupied by one transmission of the one transport block, wherein one transmission of the one transport block occupies a plurality of time units; and/or,
  determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block.

Optionally, the resource allocation information comprises at least one of information indicating a number of time units occupied by one transport block, position information of a first time unit, starting position information, length information, a number of symbols in each time unit, a granularity of at least one time domain sub-block a number of time domain sub-blocks, a time domain resource allocation TDRA table for indicating information of resource allocation in time domain, and an index in the TDRA table to indicate the information of resource allocation in time domain, subcarrier spacing, a granularity of frequency domain resource sub-block, information of a number of subcarriers in at least one sub-physical resource block, a size of a bandwidth part (BWP), and size of bandwidth occupied by BWP.

Optionally, the starting position information comprises position information of a start symbol in a time unit; the length information comprises length information of a symbol; the granularity of a sub-block comprises at least one symbol or at least one time unit;

Optionally, the configuration information comprises information, for indicating transmission scheduling, configured to the UE by a base station through radio resource control RRC; the scheduling information comprises information, for indicating transmission scheduling, transmitted to the UE by the base station through downlink control information DCI.

Optionally, the number of time units is defined or configured as any of the following:
  the number of time units includes the number of starting time unit, the number of complete time unit(s) other than time units for start position and end position, and the number of ending time unit;
  the number of time units includes the number of time units other than the time units occupied by the start position and the end position;
  the number of time units includes the number of complete time units.

Optionally, the determining, according to the resource allocation information, time domain resource position occupied by one transmission of one transport block and/or total symbol length occupied by one transmission of the one transport block, comprises at least one of:
  determining the time domain resource position occupied by one transmission of the one transport block and/or the total symbol length occupied by one transmission of the one transport block, according to the starting symbol position of the transport block on a first time unit, symbol length on a last time unit and a number of time units, included in the resource allocation information;
  determining the total symbol length according to at least one of following included in the resource allocation information: a parameter for indicating a number of time units occupied by one transport block, starting position information, length information, a number of symbols in each time unit, and a number of time domain sub-blocks, wherein the starting position information and the length information are indicated separately or jointly indicated;
  determining the time domain resource position occupied by one transmission of the one transport block and the total symbol length occupied by one transmission of the one transport block, according to the starting position information, the length information and the number of the time domain sub-blocks included in the resource allocation information, wherein the starting position information and the length information indicates position and symbol length of a starting symbol in a time unit occupied by a first time domain sub-block;

determining the total symbol length according to at least one of following included in the resource allocation information: a parameter for indicating a number of time domain sub-blocks occupied by one transport block and a number of symbols in each time domain sub-block;

determining a granularity of the at least one time domain sub-block according to the resource allocation information, and determining time domain resource position occupied by one transport block according to the starting position information and a number of at least one time domain sub-blocks, included in the time domain resource allocation information.

Optionally, determining time domain positions of the time domain sub-blocks other than the first time domain sub-block according to the predefined rule(s) and at least one of a position of starting symbol, a symbol length, and a position of ending symbol in the first time-domain sub-block.

Optionally, the predefined rules include at least one of:
in consecutive N time units, each time domain sub-block occupies a same symbol allocation, wherein N is a positive integer;
determining symbol allocation occupied by the first time domain sub-block according to the starting position information and the length information, and occupying subsequently symbols available for data transmission N times continuously.

Optionally, the way for indicating the starting symbol position in the first time unit and/or the total symbol length occupied by one transmission of the transport block comprises at least one of:
configuring the TDRA table by radio resource control RRC, for configuring the starting symbol position and the total symbol length occupied by one transmission of the transport block;
jointly encoding the starting symbol position and the total symbol length occupied by one transmission of the transport block and indicating in the TDRA table.

Optionally, determining at least one time domain sub-block according to the resource allocation information, wherein determining at least one time domain sub-block according to the resource allocation information comprises:
determining, according to the resource allocation information, a size of a time domain sub-block as L symbols or L time units, wherein L is a positive integer;
determining the granularity of the at least one time domain sub-block according to the resource allocation information, including:
according to the time domain resource allocation information, it is determined that granularity of a first time domain sub-block for determining starting position is Q symbols or Q time units, and granularity of a second time domain sub-block for determining transmission length is M symbols or M time units, wherein Q and M are positive integers.

Optionally, determining the granularity of the at least one time domain sub-block according to the resource allocation information comprises:
determining the granularity of the at least one time domain sub-block according to the subcarrier spacing in the resource allocation information and the corresponding relationship predefined or configured by a base station between a subcarrier spacing and the granularity of a time domain sub-block;
or, determining the granularity of the at least one time domain sub-block according to the granularity of a frequency domain resource sub-block in the resource allocation information, and corresponding relationship predefined or configured by the base station between the granularity of the frequency domain resource sub-block and the granularity of a sub-block.

Optionally, the way for determining a number of subcarriers in at least one sub-physical resource block according to the resource allocation information comprises at least one of:
determining the number of subcarriers in the at least one sub-physical resource block according to the information for indicating the number of subcarriers in the at least one sub-physical resource block in the resource allocation information;
determining the number of subcarriers in the at least one sub-physical resource block according to the information for indicating a size of a band width part (BWP) or a size of bandwidth occupied by the BWP in the resource allocation information;
determining the number of subcarriers in the at least one sub-physical resource block according to the information for indicating subcarriers spacing and the bandwidth information of the at least one sub-physical resource block in the resource allocation information;
determining the number of subcarriers in the at least one sub-physical resource block according to the information for indicating a number of symbols allocated in time domain for transmission of one transport block or a number of symbols of a time-domain unit in the resource allocation information.

Optionally, determining the frequency domain resource position occupied by the one transport block according to the number of subcarriers in the at least one sub-physical resource block comprises:
determining the starting position of a frequency domain resource occupied by one transport block according to a number of subcarriers in a first sub-physical resource block of the number of subcarriers in the at least one sub-physical resource block;
determining a size of the frequency domain resource occupied by one transport block according to a number of subcarriers in a second sub-physical resource block of the number of subcarriers in the at least one sub-physical resource block.

In a seventh aspect, the present application provides a method for determining a resource, applied to a base station, comprising:
transmitting resource allocation information;
determining, according to the resource allocation information, time domain resource position occupied by one transmission of one transport block and/or total symbol length occupied by one transmission of the one transport block, wherein one transmission of the one transport block occupies a plurality of time units; and/or,
determining, according to the resource allocation information, a number of subcarriers in at least one sub-physical resource block, and determining frequency domain resource position occupied by the one transport block according to the number of subcarriers in the at least one sub-physical resource block, wherein the number of subcarriers in the at least one sub-physical resource block is less than a number of subcarriers in one physical resource block.

In an eighth aspect, the present application provides a UE, comprising:
a first processing module, configured to receive resource allocation information;
a second processing module, configured to determine, according to the resource allocation information, time domain resource position occupied by one transmission of one transport block and/or total symbol length occupied by one transmission of the one transport block, wherein one transmission of the one transport block occupies a plurality of time units; and/or,
a second processing module, configured to determine, according to the resource allocation information, a number of subcarriers in at least one sub-physical resource block, and determining frequency domain resource position occupied by the one transport block according to the number of subcarriers in the at least one sub-physical resource block, wherein the number of subcarriers in the at least one sub-physical resource block is less than a number of subcarriers in one physical resource block.

In a ninth aspect, the present application provides a base station, comprising:
a third processing module, configured to transmit resource allocation information;
a fourth processing module, configured to determine, according to the resource allocation information, time domain resource position occupied by one transmission of one transport block and/or total symbol length occupied by one transmission of the one transport block, wherein one transmission of the one transport block occupies a plurality of time units; and/or,
a fourth processing module, configured to determine, according to the resource allocation information, a number of subcarriers in at least one sub-physical resource block, and determining frequency domain resource position occupied by the one transport block according to the number of subcarriers in the at least one sub-physical resource block, wherein the number of subcarriers in the at least one sub-physical resource block is less than a number of subcarriers in one physical resource block.

In a tenth aspect, the present application provides a UE, comprising a processor, a memory and a bus,
the bus is configured to connect the processor and the memory;
the memory is configured to store computer programs;
the processor is configured to perform the method for determining a resource in the first aspect of the application.

In a sixth aspect, the present application provides a base station comprising a processor, a memory and a bus,
the bus is configured to connect the processor and the memory;
the memory is configured to store computer programs;
the processor is configured to perform the method for determining a resource in the second aspect of the application.

Advantageous Effects of Invention

The technical solutions provided in the application at least has the following beneficial effects: receiving resource allocation information; determining, according to the resource allocation information, time domain resource position occupied by one transmission of one transport block and/or total symbol length occupied by one transmission of the one transport block, wherein one transmission of the one transport block occupies a plurality of time units; and/or, determining, according to the resource allocation information, a number of subcarriers in at least one sub-physical resource block, and determining frequency domain resource position occupied by the one transport block according to the number of subcarriers in the at least one sub-physical resource block, wherein the number of subcarriers in the at least one sub-physical resource block is less than a number of subcarriers in one physical resource block. The present application achieves more efficient resource allocation for transmitting the transport block.

According to the present disclosure, a method and an apparatus are proposed to enhance a physical downlink control channel (PDCCH) to improve the coverage of the PDCCH.

Additional aspects and advantages of the present disclosure will be given in the following description, which will become apparent from the following description or be understood through the practice of the present disclosure.

BRIEF DESCRIPTION OF DRAWINGS

In order to explain technical solutions in embodiments of the present application more clearly, the drawings that are used in description of the embodiments of the present application will be briefly explained below.

MODE FOR THE INVENTION

Figure 1:
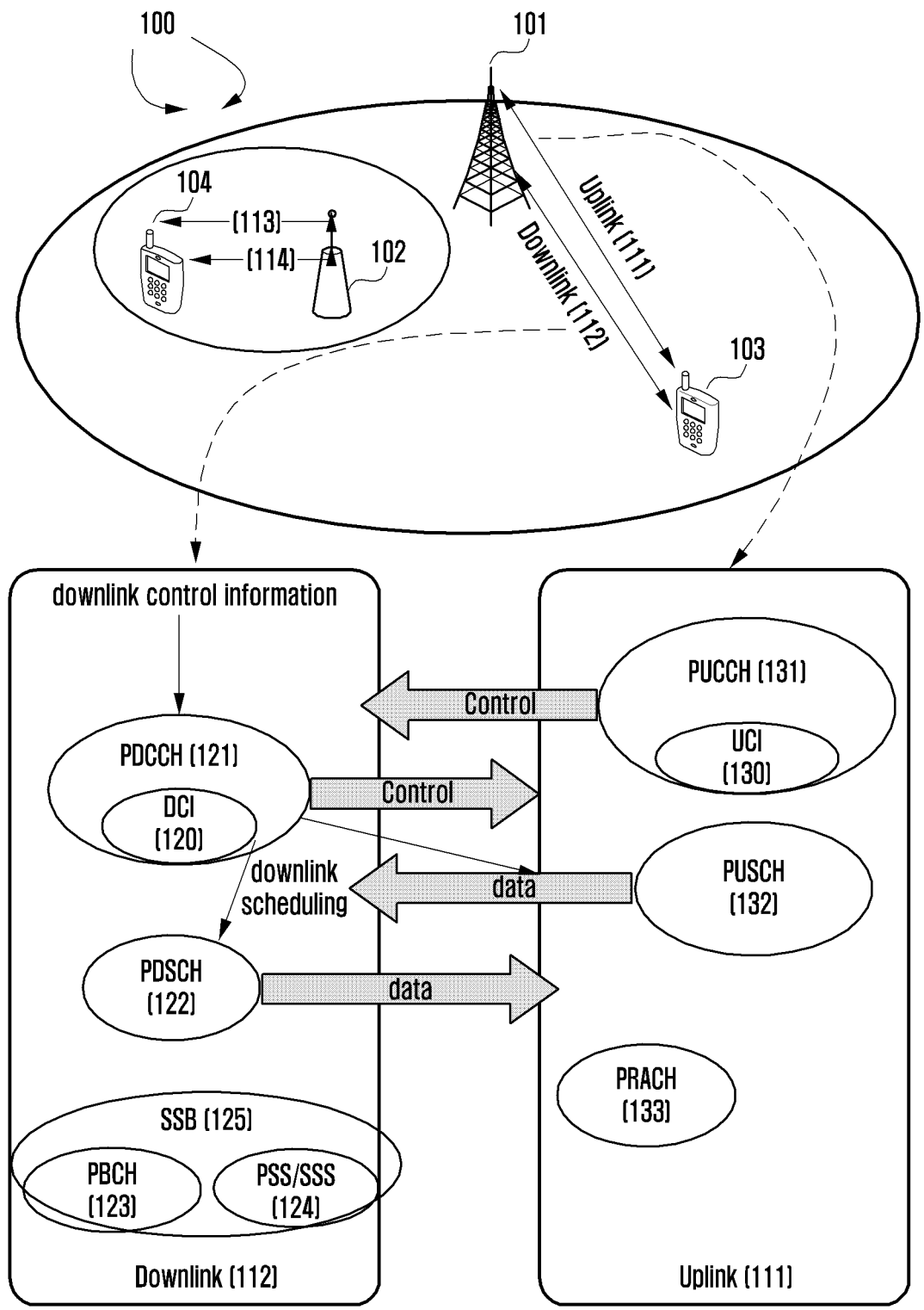
FIG. 1 is a schematic diagram illustrating a wireless communication system.

Hereinafter, embodiments of the present application are detailed described. Examples of the embodiments are shown in the accompanying drawings, wherein the same or similar reference numerals represent the same or similar elements or elements having the same or similar functions throughout. The embodiments described below with reference to the drawings are exemplary and are only used to explain the present application, and cannot be construed as limiting the present application.

Those skilled in the art will understand that, unless specifically stated otherwise, the singular forms "a", "an" and "the", "said" may include plural forms. It should be further understood that the word "comprise" and "include" used in the specification of the present application refers to the presence of the described features, integers, steps, operations, elements and/or components, but does not exclude the presence or addition of one or more other features, integers, steps, operations, elements, components, and/or combinations thereof. It should be understood that when an element is referred to as being "connected" or "coupled" to another element, it can be directly connected or coupled to the other element, or intermediate elements may also be present. Furthermore, "connected" or "coupled" as used herein may include wirelessly connected or wirelessly coupled. As used herein, the term "and/or" includes all or any of the elements and all combinations of one or more of the associated listed items.

The present disclosure will be further described below in detail in combination with the accompanying drawings and the embodiments. It may be appreciated that the specific embodiments described herein are merely used for explaining the relevant disclosure, rather than limiting the disclosure.

It should be noted that the embodiments in the present disclosure and the features in the embodiments may be combined with each other on a non-conflict basis. The present disclosure will be described below in detail with reference to the accompanying drawings and in combination with the embodiments.

The terminologies used in the present disclosure are used to describe specific embodiments and not intended to limit the scope of other embodiments. The expressions that do not specify the quantity may usually be one or more, unless specifically stated otherwise. All terminologies used herein, including technical and scientific terms, may have the same meaning as those generally understood by those skilled in the art to which the present disclosure belongs.

In the following description, a base station is an access device that connects a communication device to a cellular network, which is used to allocate communication resources to the communication device. The base station may be any of the following entities: gNB, ng-eNB, eNB, radio access unit, base station controller, base station transceiver, etc. The communication device may be any device that is intended to access services via an access network and can be configured to communicate via the access network. For example, the communication device may include, but is not limited to: a user terminal UE, a mobile station MS, a cellular phone, a smart phone, a computer, or a multimedia system configured with a communication function. It should be noted that in the following description, the terms "communication device", "user equipment", "user terminal", "terminal" and "UE" may be used interchangeably.

It should be understood that the embodiments disclosed herein may be applied in various types of cellular networks.

In order to better understand and explain the solutions of the embodiments of the present disclosure, some technologies involved in the embodiments of the present disclosure are briefly described below.

FIG. 1 shows an example of a wireless communication system 100, wherein the wireless communication system 100 includes one or more fixed infrastructure units, which form a network distributed over a geographic area. The infrastructure units may include an access point (AP), an access terminal (AT), a base station (BS), Node B (Node-B), evolved NodeB (eNB) and next generation base station (gNB), or other terms used in the art.

As shown in FIG. 1, the infrastructure units 101 and 102 provide services for several mobile stations (MSs) or UEs or terminal devices or users 103 and 104 in the service area, and the service area is within a range of cell or a cell sector. In some systems, one or more BSs are communicatively coupled to a controller forming an access network, and the controller is communicatively coupled to one or more core networks. The present example is not limited to any particular wireless communication system.

In time domain and/or frequency domain, the infrastructure units 101 and 102 transmit downlink (DL) communication signals 112 and 113 to the MSs or UEs 103 and 104, respectively. MSs or UEs 103 and 104 communicate with infrastructure units 101 and 102 through uplink (UL) communication signals 111 and 114, respectively.

Optionally, the mobile communication system 100 is an Orthogonal Frequency Division Multiplexing (OFDM)/Orthogonal Frequency Division Multiple Access (OFDMA) system, including multiple base stations and multiple UEs, the multiple base stations include a base station 101, a base station 102, and the multiple UEs include UEs 103 and UE 104. The base station 101 communicates with the UE 103 through the UL communication signal 111 and the DL communication signal 112.

When the base station has downlink packets to be transmitted to the UE, each UE will obtain a downlink allocation (resource), such as a group of radio resources in the Physical Downlink Shared Channel (PDSCH). When the UE needs to transmit a packet to the base station in the uplink, the UE obtains an authorization from the base station, wherein the authorization allocates a Physical Uplink Shared Channel (PUSCH) including a set of uplink radio resources. The UE obtains downlink or uplink scheduling information from a Physical Downlink Control Channel (PDCCH) specified for itself. The downlink or uplink scheduling information and other control information carried by the PDCCH are called Downlink Control Information (DCI).

FIG. 1 also illustrates different physical channels for the downlink 112 and uplink 111 examples. The downlink 112 includes PDCCH 121, PDSCH 122, a Physical Broadcast Channel (PBCH) 123, and a Primary Synchronization Signal (PSS)/a Secondary Synchronization Signal (SSS) 124. In 5G NR, PSS, SSS, and PBCH together constitute an SS/PBCH block (SSB) 125. The PDCCH 121 transmits DCI 120 to the UE, that is, the DCI 120 is carried by the PDCCH 121. The PDSCH 122 transmits downlink data information to the UE. The PBCH carries Master Information Block (MIB), which is used for UE's early discovery and cell-wide coverage. The uplink 111 includes Physical Uplink Control Channel (PUCCH) 131 carrying Uplink Control Information (UCI) 130, PUSCH 132 carrying uplink data information, and Physical Random Access Channel (PRACH) 133 carrying random access information. In addition to the traditional cellular networking method, the present invention can also be applied to a resource allocation method for sidelink transmission. The sidelink transmission refers to communication between terminals.

Optionally, the wireless communication network 100 uses an OFDMA or multi-carrier architecture, including Adaptive Modulation and Coding (AMC) on the downlink and a next-generation single-carrier FDMA architecture or multi-carrier OFDMA architecture for UL transmission. FDMA-based single carrier architecture includes Interleaved FDMA (IFDMA), Localized FDMA (LFDMA), DFT-spread OFDM (DFT-SOFDM) of IFDMA or LFDMA. In addition, various enhanced non-orthogonal multiple access (NOMA) architectures of the OFDMA system are also included.

OFDMA system serves remote units by allocating downlink or uplink radio resources that typically include a set of subcarriers on one or more OFDM symbols. For example, OFDMA protocols include the developed LTE and 5G NR in the 3GPP UMTS standard, and a series of standards such as IEEE 802.16 in the IEEE standard. The architecture may also include the use of transmission technologies, such as multi-carrier CDMA (MC-CDMA), multi-carrier direct sequence CDMA (MC-DS-CDMA), Orthogonal Frequency and Code Division Multiplexing (OFCDM). Alternatively, it may use simpler time and/or frequency division multiplexing/multiple access technologies, or a combination of these different technologies. In an optional implementation manner, the communication system may use other cellular communication system protocols, including but not limited to Time Division Multiple Access (TDMA) or Direct Sequence Code Division Multiple Access (Direct Sequence CDMA).

In a NR system, the minimum unit of resource allocation in frequency domain is a PRB. In order to reduce the resource allocation overhead in the frequency domain, NR follows the concept of resource block group (RBG) in LTE. The size of a RBG is determined according to the configuration from the base station and bandwidth of a bandwidth part (BWP). In the frequency domain, a transport block (TB) occupies a maximum of 14 symbols in a slot, which is indicated in time domain resource allocation (TDRA) of the downlink control information DCI. Before Radio Resource Control (RRC) connection setup, a TDRA table is predefined in the protocol, including: a parameter K0 (for PDSCH) or K2 (for PUSCH) indicating position of the slot, start position S and length L of a symbol in the slot, and data transmission mapping type (type of DMRS mapping such as Type A and Type B). For the downlink data channel PDSCH, the pre-defined TDRA table further includes an indication of DMRS position. After RRC connection setup, the base station may configure a new TDRA table to the UE by RRC to indicate time domain resource allocation information. In order to reduce signaling overhead, a joint coding start and length indicator (SLIV) indicating the start symbol S and the length L is used to indicate the start position S and the length L of the symbol in the slot.

Physical uplink shared channel (PUSCH) is described as an example, and the same method is applicable to physical downlink shared channel (PDSCH).

PUSCH-TimeDomainResourceAllocation ::= SEQUENCE {
k2 INTEGER(0..32) OPTIONAL, -- Need S
mappingType ENUMERATED {typeA, typeB},
startSymbolAndLength INTEGER (0..127)
}

The slot of the PUSCH transmitted by the UE is determined by K2 as $$\left\lfloor n \cdot \frac{2^{\mu_{PUSCH}}}{2^{\mu_{PDCCH}}} \right\rfloor + K_2.$$

Where n is the slot where the DCI is scheduled, K2 is determined based on the numerology of PUSCH, and $\mu_{PUSCH}$ and $\mu_{PDCCH}$ are the subcarrier spacing of PUSCH and PDCCH, respectively. The starting symbol S, assigned to the PUSCH, relative to the starting slot, and the number L of consecutive symbols calculated from the symbol S are decided through the following formula (1) and formula (2) and according to indication of starting and length (the SLIV) corresponding to the row of the index:

if $(L-1) \leq 7$ then SLIV=14·$(L-1)$+S  (Formula 1)

else, SLIV=14·(14−$L$+1)+(14−1−$S$)  (Formula 2)

where $0 < L \leq 14 - S$.

The mapping type of PUSCH is set according to the mapping type corresponding to the row of the index, based on the PUSCH mapping type of Type A and Type B defined in Section 6.4.1.1.3 in the protocol TS 38.211. The TDRA table for PDSCH and the TDRA table for PUSCH are configured in a similar manner.

In a NB-IoT system, in order to support coverage enhancement, the concept of resource unit (RU) is defined so that one transmission of a TB can span multiple subframes. In the NB-IoT, the number of resource elements (RE) contained in one RU is the same. The length of the RU is calculated by indicating the number of carriers occupied by each RU. In addition, the length of the corresponding transport block (TB) size is calculated by indicating the number of RUs.

For OFDM communication systems with large subcarrier spacing (e. g., subcarrier spacing of 120 kHz or 240 kHz) and/or systems requiring enhanced coverage, especially for systems requiring enhanced uplink coverage, one transport block also needs to be on multiple resource units in the time domain (such as slots, subframes, one or several symbols, time units in the time domain, etc.). Compared with the, method of using multiple repetitions or multiple transmissions, a lower bit rate can be provided to obtain better performance, especially when the transmission bandwidth is limited.

For the TDRA table configured by RRC, the starting symbol S and the symbol length L are calculated according to the value of SLIV in the TDRA table and Formula (1) to obtain S and L; or the value of SLIV is calculated according to S and L, and the SLIV is indicated in the TDRA table, or the starting symbol S and the symbol length L are directly indicated in the TDRA table.

In a communication system, a sending end usually controls a receiving end to receive a signal through a sending control channel. In a cellular communication system, the base station controls signal reception and sending of the UE by sending a physical downlink control channel (PDCCH). The base station sends the PDCCH on part or all of the resources in a specific downlink time-frequency resource set. In order to ensure the UE receives the PDCCH correctly, the base station needs to configure the downlink time-frequency resource set for the UE.

For example, in a 5G system, the base station configures a control resource set (CORESET) for determining frequency domain resource information for a user, for example, a physical resource block (PRB), a time domain resource length (such as the number of continuously occupied OFDM symbols), a mapping method, etc. The base station also configures a search space (SS) for determining time resource information for the user, for example, a period, a time offset, a symbol starting point, a search space type, a downlink control information (DCI) format, an aggregation level (AL), number of blind detections, etc. Each search space (SS) has a corresponding relationship with a control resource set CORESET. Based on the information, the UE may determine which PDCCHs may be detected on which time-frequency resources, and determine the ALs of these PDCCHs, and so on.

Typically, one PDCCH may include L1 control channel elements (CCE), one CCE may include L2 resource element groups (REG), and one REG may include M PRBs. According to different values of L1, the AL of the PDCCH is different, and the AL has the same value as L1. For example, when AL=1, L1=1, that is, the PDCCH with AL 1 includes one CCE. In the existing 5G system, one CCE includes 6 REGs, that is, L2=6. One REG includes M=1 PRB, where the time unit of the PRB is 1 symbol. Where a bit overhead of the PDCCH is constant, that is, the size of the DCI format is constant, the larger the AL, the lower the coding rate and the better the performance.

Figure 2:
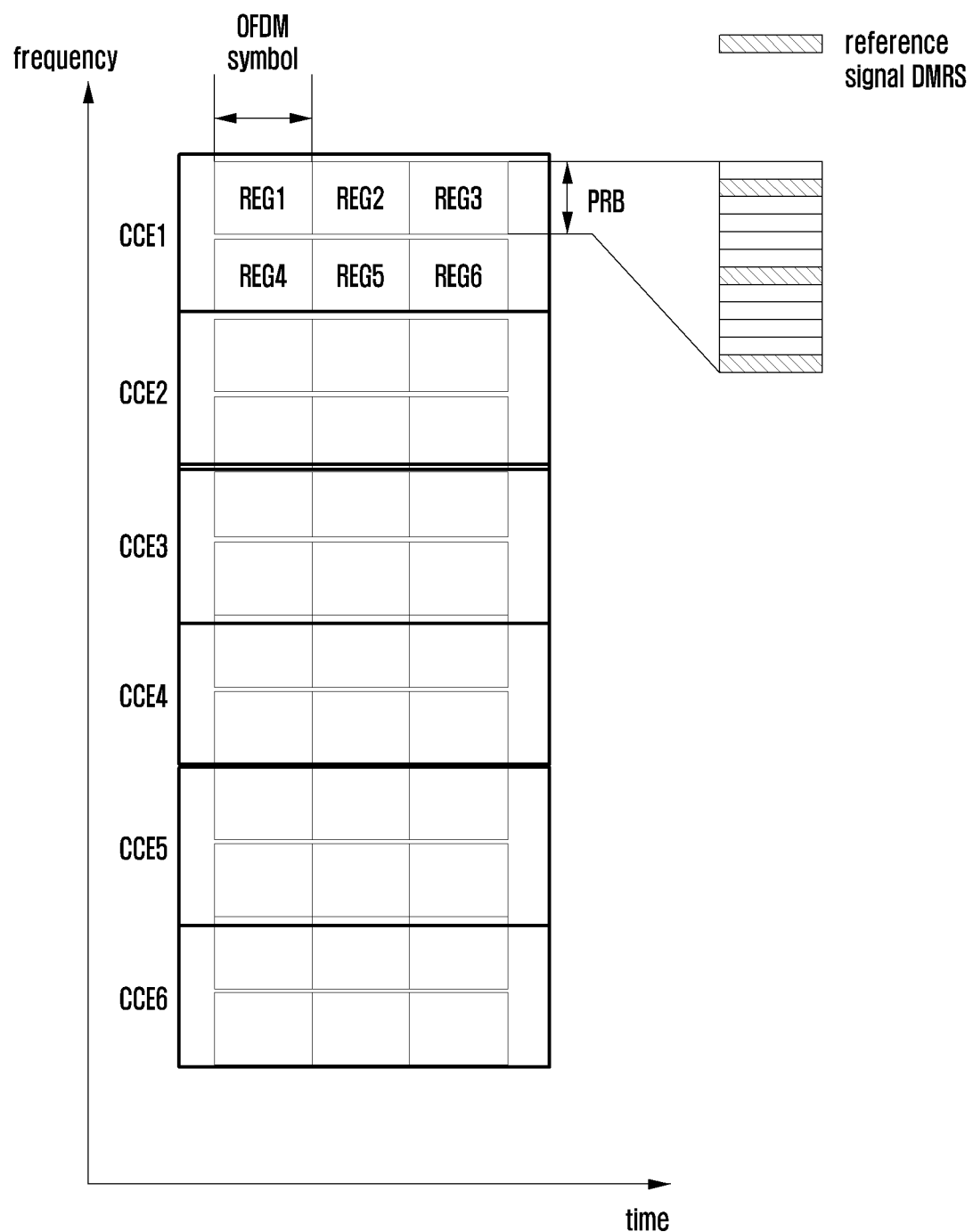
FIG. 2 shows an exemplary time-frequency resource mapping from a control resource set CORESET.

A plurality of REGs of one CCE are mapped in the time-frequency resource of a control resource set CORESET, typically according to the rule of time before frequency. FIG. 2 shows an exemplary time-frequency resource mapping of a control resource set CORESET. As shown in FIG. 2, the time resource of the CORESET is 3 OFDM symbols, the frequency domain resource is 12 PRBs, there is a total of 36 PRBs, corresponding to 6 CCEs (CCE1 to CCE6), 36 REGs (each CCE includes 6 REGs, for example, CCE1 includes REG1 to REG6). Then, in the 6 REGs of one CCE, the first 3 REGs correspond to the same frequency domain position, but occupy different OFDM symbols. The last 3 REGs correspond to the same frequency domain position, but occupy different OFDM symbols, and the first 3 REGs and the last 3 REGs occupy different frequency domain positions.

The physical resource mappings of the REGs and the CCEs in FIG. 2 are both logical illustrations. When the REGs and CCEs are mapped to physical resources, the physical resources to which the REGs and CCEs are mapped may be different based on different mapping methods.

For example, a CCE may be mapped to a REG based on interleaving to obtain a frequency diversity gain. Based on this mapping method, a plurality of REGs in one CCE may be discontinuous in the frequency domain. The intervals in the frequency domain of each REG may be determined by an interleaving factor. The minimum resource unit of interleaving is one REG bundle. The REGs in one REG bundle use the same precoders. Since demodulation reference signals (DMRS) in one REG bundle use the same precoders, a channel estimation result based on these DMRSs may be interpolated. For example, one REG bundle may include a plurality of REGs, for example, REGi may include REG $\{iL, iL+1, \ldots, iL+L-1\}$, where L is the size of the REG bundle. One CCE may include one or more REG bundles. For example, CCEj may include one or a plurality of REG bundles $$\{f(6j/L), f(6j/L+1), \ldots, f(6j/L+6/L-1)\},$$

where $f(\bullet)$ is an interleaving function, as shown below.

$$f(j)=(rC+c+n_{shift}) \bmod (N_{REG}^{CORESET}/L) \qquad (1)$$

$j=cR+r$, $r=0, 1, \ldots, R-1$, $c=0, 1, \ldots, C-1$, $C=N_{REG}^{CORESET}/(LR)$ Here, R is the interleaving factor. $n_{shift}$ is configured according to a cell ID or high-level signaling, and $N_{REG}^{CORESET}$ is the total number of REGs in one CORESET.

Figure 3:
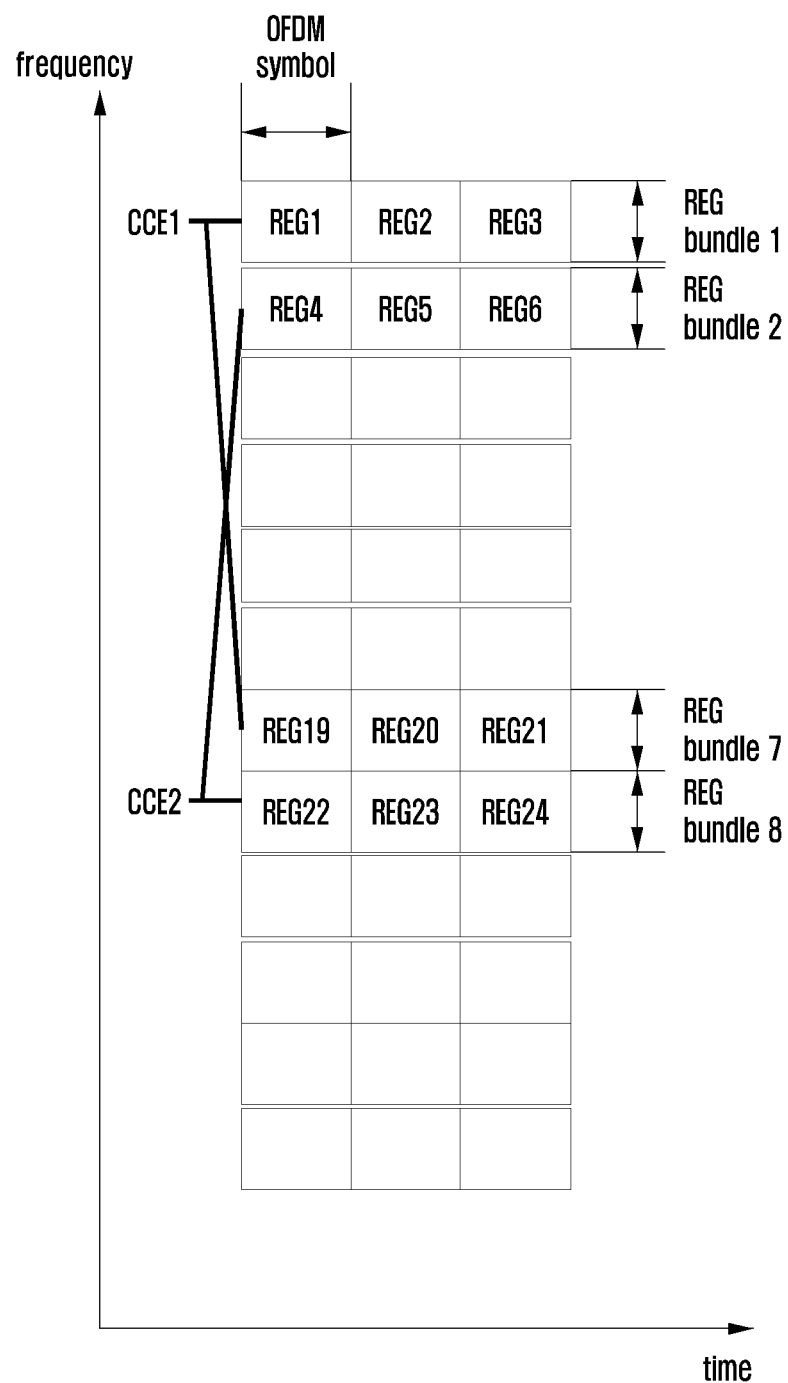
FIG. 3 shows an exemplary REG bundle in an exemplary time-frequency resource mapping of a CORESET.

FIG. 3 shows an exemplary REG bundle in an exemplary time-frequency resource mapping of a CORESET. As shown in FIG. 3, $N_{REG}^{CORESET}=36$, one REG bundle includes L=3 REGs, that is, REGs on 3 symbols occupying the same frequency domain position form one REG bundle. Assuming that the interleaving factor R=2, then each CCE includes two REG bundles. For example, CCE1 includes 2 REG bundles, REG bundle 1 and REG bundle 7, where three REGs of REG bundle 1 (REG1~3) occupy the first frequency domain resource, and three REGs of REG bundle 7 (REG19~21) occupy the seventh frequency domain resource. If AL>1 in the PDCCH, for example, AL=2, the REG1~3 of REG bundle 1 of CCE1 occupy the first frequency domain position (the first PRB in 3 OFDM symbols), the REG19~21 of REG bundle 7 of CCE1 occupy the seventh frequency domain position (the seventh PRB in 3 OFDM symbols), three REGs (REG4~6) of REG bundle 2 of CCE2 occupy the second frequency domain position (the second PRB in 3 OFDM symbols), and three REGs (REG22~24) of REG bundle 8 of CCE2 occupy the eighth frequency domain position (the eighth PRB in 3 OFDM symbols). It should be noted that the indexes of the CCE/REG/REG bundles in formula (1) all are counted from 0, but for convenience of description, the indexes all are counted from 1 in the present disclosure, and the two way of counting are equivalent.

The mapping from a CCE to a REG may also be continuous to obtain a frequency selective gain. Based on this mapping method, a plurality of REGs in one CCE are continuous in the time-frequency resource. For example, CCE includes one or more REG bundles $\{f(6j/L), f(6j/L+1), \ldots, f(6j/L+6/L-1)\}$, where $f(j)=j$. The REGs in one CCE use the same precoders (i.e., the size L of a REG bundle equals to the number of REGs included in one CCE). Channel estimation results of DMRSs of the REGs in one CCE may be interpolated.

Figure 4:
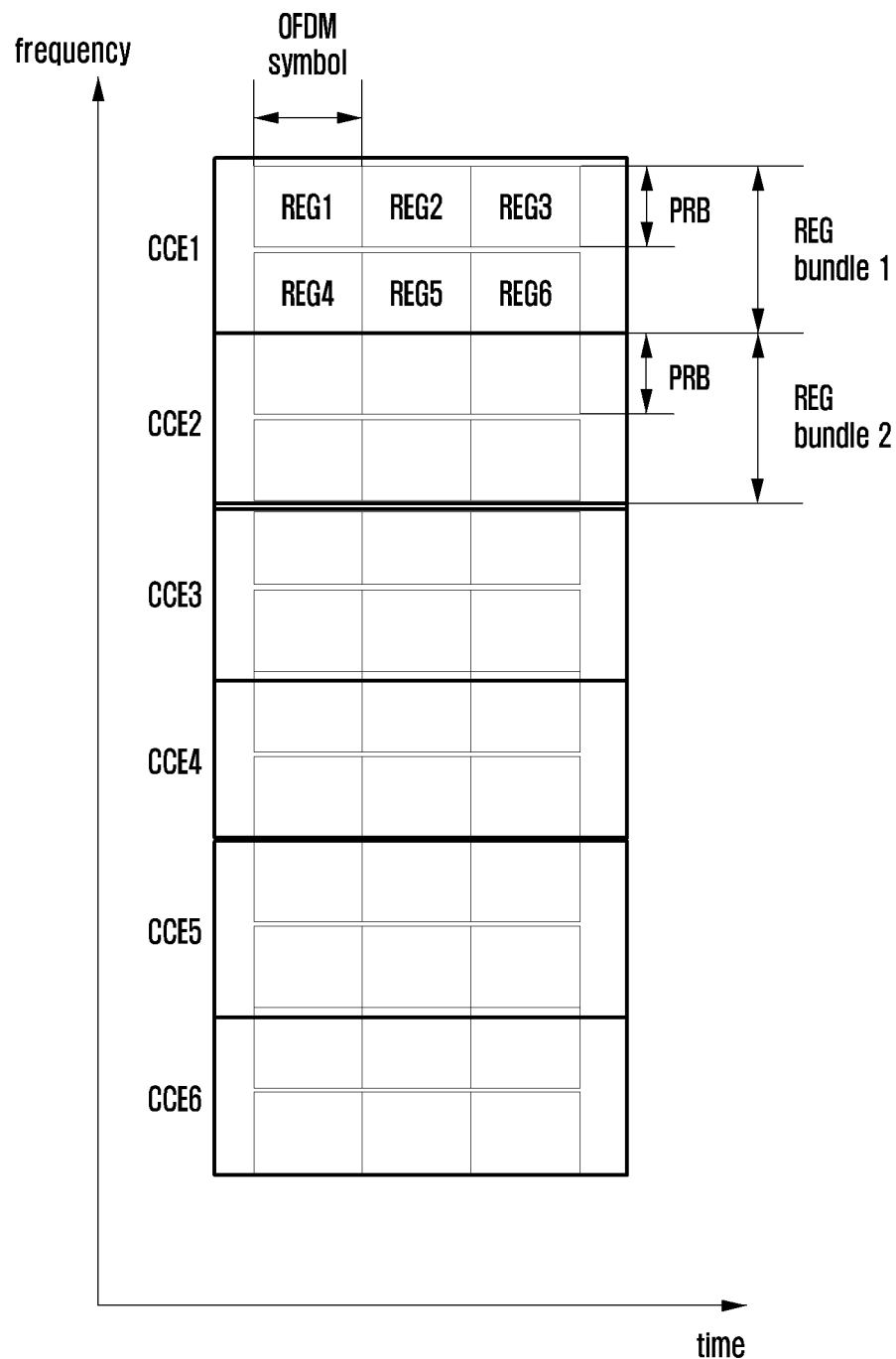
FIG. 4 shows an exemplary REG bundle in an exemplary time-frequency resource mapping of a CORESET.

FIG. 4 shows an exemplary REG bundle in an exemplary time-frequency resource mapping of a CORESET. As shown in FIG. 4, the first three REGs (REG1~3) of a CCE (CCE1) occupy the first frequency domain position, and the last three REGs (REG4~6) occupy the second frequency domain position. If AL>1 in the PDCCH, for example, AL=2, the REG1~3 of CCE1 occupy the first frequency domain position, the REG4~6 of CCE1 occupy the second frequency domain position, the REG1~3 of CCE2 occupy the third frequency domain position, and the REG4~6 of CCE2 occupy the fourth frequency domain position.

In the above illustration, the frequency domain resources of the CORESET are continuous, that is, a total of 12 PRBs of CCE1 and CCE2 are continuous. In practical applications, the frequency domain resources of the CORESET use a group of N PRBs as the minimum continuous resource granularity, and the groups of N PRBs may be discontinuous, which does not affect the mapping method described above. For example, the first 6 PRBs of the 12 PRBs are continuous, occupying the $11^{th}$ to $16^{th}$ PRBs of a system bandwidth, and the last 6 PRBs of the 12 PRBs are also continuous, occupying the $30^{th}$ to $36^{th}$ PRBs of the system bandwidth. The REG/CCE may still be mapped to these 12 PRBs according to the rule described above.

It shall be appreciated that, in order to improve the accuracy of channel estimation, the base station may configure the same precoders in one REG bundle, and may also configure the same precoders on a continuous frequency domain resource in the CORESET. For example, a CORESET includes 48 PRBs, of which the first 24 PRBs are continuous, and the last 24 PRBs are continuous. Then, the precoders of each group of continuous 24 PRBs is the same. The UE may assume that the DMRSs on these 24 PRBs may all be used for channel estimation and interpolation, even if the UE only detects one PDCCH with AL=1 on 6 of the PRBs.

As mentioned above, each search space has a corresponding relationship with a CORESET. For example, when configuring this search space, the CORESET corresponding to this search space may be configured. The forming and mapping of the REG/CCE are carried out in each CORESET. The forming and mapping of the REG/CCE of the search spaces corresponding to the same CORESET are the same.

Figure 5:
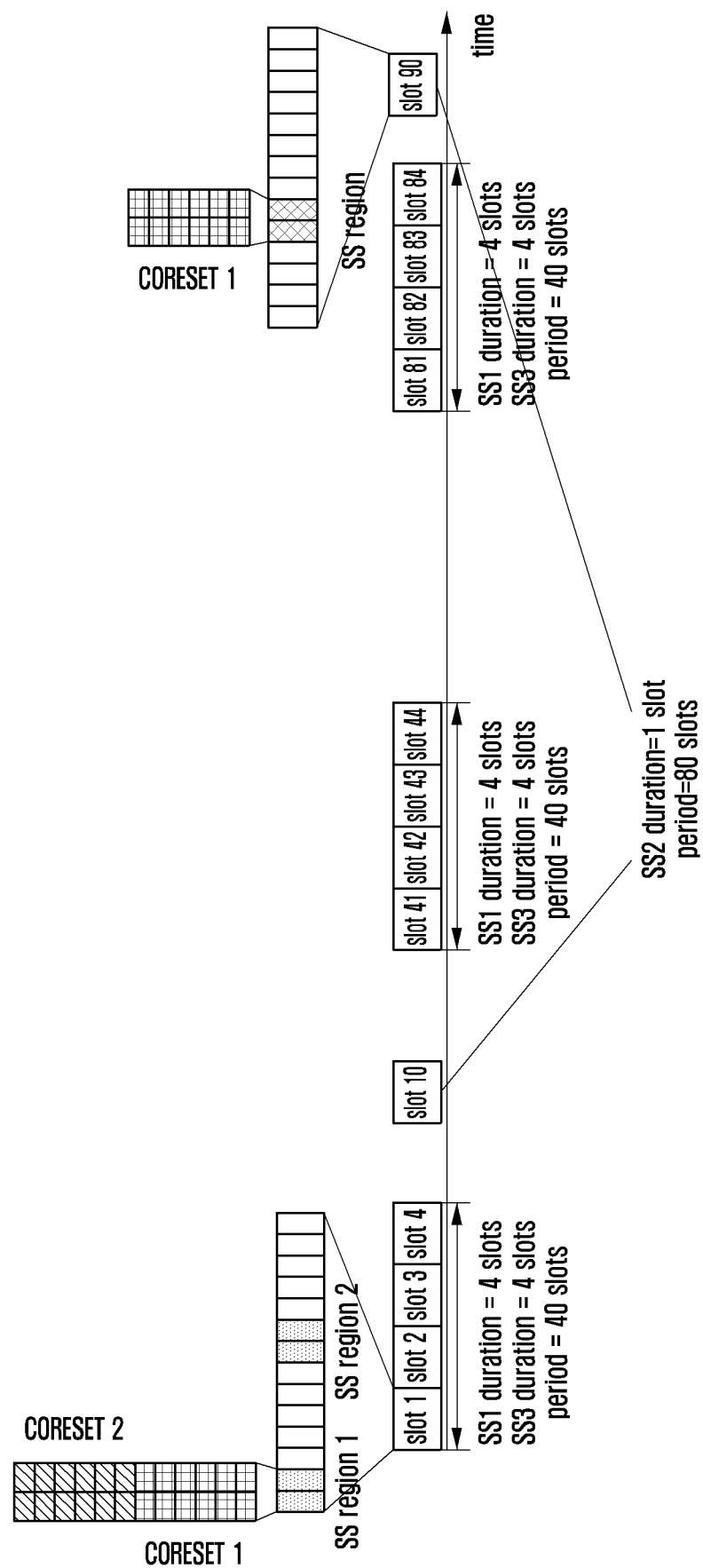
FIG. 5 shows an exemplary mapping from a CORESET to a search space SS.

FIG. 5 shows an exemplary mapping of a CORESET and a search space SS. As shown in FIG. 5, the base station configures 3 search spaces SS1, SS2 and SS3 for the UE, corresponding to CORESET1, CORESET1 and CORESET2, respectively. The length of CORESET1 is 2 symbols, and the time domain resources of SS1 and SS3 are configured with a period of 40 slots and an offset of 0. The duration of SS1 and SS3 is 4 slots, and the $1^{st}$ to $2^{nd}$ symbols and $8^{th}$ to $9^{th}$ symbols of each slot include CORESET1, respectively. The time domain resource of SS2 is configured with a period of 80 slots and an offset of 10, and the duration is 1 slot. A group of SS symbols corresponding to a complete CORESET resource is recorded as an SS region, or a PDCCH monitoring occasion (MO). In the subsequent description, it is referred to as the SS region. Then, for SS1 and SS3, the $1^{st}$ to $2^{nd}$ symbols in slot 1 are SS region 1, the $8^{th}$ to $9^{th}$ symbols in slot 1 are SS region 2, the $1^{st}$ to $2^{nd}$ symbols in slot 2 are SS region 3, the $8^{th}$ to $9^{th}$ symbols in slot 2 are SS region 4, the $1^{st}$ to $2^{nd}$ symbols in slot 3 are SS region 5, the $8^{th}$ to $9^{th}$ symbols in slot 3 are SS region 6, the $1^{st}$ to $2^{nd}$ symbols in slot 4 are SS region 7, the $8^{th}$ to $9^{th}$ symbols in slot 4 are SS region 8, the $1^{st}$ to $2^{nd}$ symbols in slot 41 are SS region 9, the $8^{th}$ to $9^{th}$ symbols in slot 41 are SS region 10, and so on. For SS2, the $5^{th}$ to $6^{th}$ symbols in slot 10 are SS region 1, the $5^{th}$ to $6^{th}$ symbols in slot 90 are SS region 2, and so on. The CCEs of one PDCCH of SS1 or SS3 are mapped only in the $1^{st}$ to $2^{nd}$ symbols, or the $7^{th}$ to $8^{th}$ symbols in 1 slot of slots 1 to 4, slots 41 to 44 . . . , that is, SS region cannot be crossed, for example, the CCEs of one PDCCH of SS1 cannot be dispersed in the first SS region and the second SS region.

In order to make the objectives, technical solutions and advantages of the present application clearer, embodiments of the present application will be further described below in details with reference to the accompanying drawings.

Embodiment 1

Figure 6:
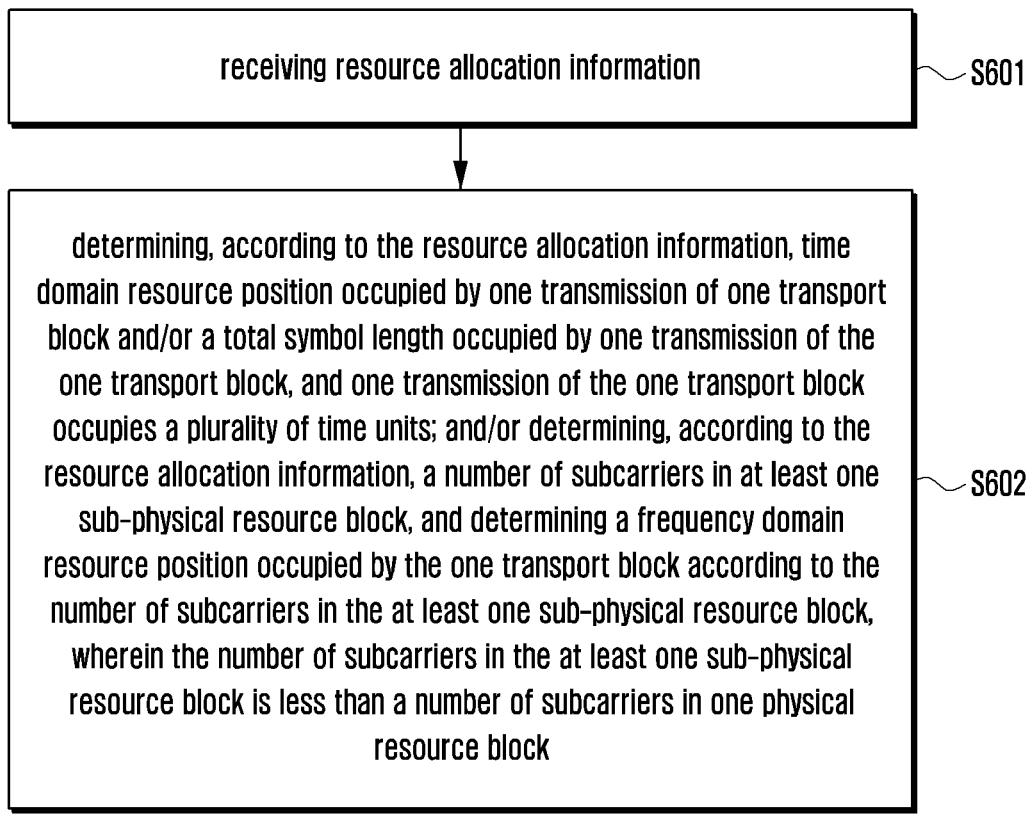
FIG. 6 is a schematic flowchart illustrating a resource determination method provided in an embodiment of the present application.

An embodiment of the present application provides a resource determination method, which is applied to a UE. A schematic flowchart of the method is shown in FIG. 6, and the method includes the following steps.

Step S601: Receiving resource allocation information.

Step S602: Determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block.

In an embodiment of the present application, receiving resource allocation information; determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block. The present application achieves more efficient resource allocation for transmission of the transport block.

Optionally, the resource allocation information comprises at least one of information indicating a number of time units occupied by one transport block, position information of a first time unit, starting position information, length information, a number of symbols in each time unit, a granularity of at least one time domain sub-block a number of time domain sub-blocks, a time domain resource allocation TDRA table for indicating information of resource allocation in time domain, and an index in the TDRA table to indicate the information of resource allocation in time domain, subcarrier spacing, a granularity of frequency domain resource sub-block, information of a number of subcarriers in at least one sub-physical resource block, a size of a bandwidth part (BWP), and size of bandwidth occupied by BWP.

Optionally, the starting position information comprises position information of a start symbol in a time unit; the length information comprises length information of a symbol; the granularity of a sub-block comprises at least one symbol or at least one time unit;

Optionally, the configuration information comprises information, for indicating transmission scheduling, configured to the UE by a base station through radio resource control RRC; the scheduling information comprises information, for indicating transmission scheduling, transmitted to the UE by the base station through downlink control information DCI.

Optionally, the number of time units is defined or configured as any of the following:
- the number of time units includes the number of starting time unit, the number of complete time unit(s) other than time units for start position and end position, and the number of ending time unit;
- the number of time units includes the number of time units other than the time units occupied by the start position and the end position;
- the number of time units includes the number of complete time units.

Optionally, the determining, according to the resource allocation information, time domain resource position occupied by one transmission of one transport block and/or total symbol length occupied by one transmission of the one transport block, comprises at least one of:
- determining the time domain resource position occupied by one transmission of the one transport block and/or the total symbol length occupied by one transmission of the one transport block, according to the starting symbol position of the transport block on a first time unit, symbol length on a last time unit and a number of time units, included in the resource allocation information;
- determining the total symbol length according to at least one of following included in the resource allocation information: a parameter for indicating a number of time units occupied by one transport block, starting position information, length information, a number of symbols in each time unit, and a number of time domain sub-blocks, wherein the starting position information and the length information are indicated separately or jointly indicated;
- determining the time domain resource position occupied by one transmission of the one transport block and the total symbol length occupied by one transmission of the one transport block, according to the starting position information, the length information and the number of the time domain sub-blocks included in the resource allocation information, wherein the starting position information and the length information indicates position and symbol length of a starting symbol in a time unit occupied by a first time domain sub-block;
- determining the total symbol length according to at least one of following included in the resource allocation information: a parameter for indicating a number of time domain sub-blocks occupied by one transport block and a number of symbols in each time domain sub-block;
- determining a granularity of the at least one time domain sub-block according to the resource allocation information, and determining time domain resource position occupied by one transport block according to the starting position information and a number of at least one time domain sub-blocks, included in the time domain resource allocation information.

Optionally, determining time domain positions of the time domain sub-blocks other than the first time domain sub-block according to the predefined rule(s) and at least one of a position of starting symbol, a symbol length, and a position of ending symbol in the first time-domain sub-block.

Optionally, the predefined rules include at least one of the following:
- in consecutive N time units, each time domain sub-block occupies a same symbol allocation, wherein N is a positive integer;
- determining symbol allocation occupied by the first time domain sub-block according to the starting position information and the length information, and occupying subsequently symbols available for data transmission N times continuously.

Wherein, each sub-block occupies the same symbol allocation, the symbol allocation includes the same starting position and symbol length.

Wherein, the symbols available for the data transmission include any one of symbols that can be used for uplink data transmission, symbols that can be used for downlink data transmission, and symbols that can be used for sidelink data transmission.

Optionally, the way for indicating the starting symbol position in the first time unit and/or the total symbol length occupied by one transmission of the transport block comprises at least one of:
- configuring the TDRA table by radio resource control RRC, for configuring the starting symbol position and the total symbol length occupied by one transmission of the transport block;
- jointly encoding the starting symbol position and the total symbol length occupied by one transmission of the transport block and indicating in the TDRA table.

Optionally, determining at least one time domain sub-block according to the resource allocation information, wherein determining at least one time domain sub-block according to the resource allocation information comprises:
- determining, according to the resource allocation information, a size of a time domain sub-block as L symbols or L time units, wherein L is a positive integer;
- determining the granularity of the at least one time domain sub-block according to the time domain resource allocation information, including:
- determining, according to the resource allocation information, a granularity of a first time domain sub-block for a starting position determination as Q symbols or Q time units, and a granularity of a second time domain sub-block for a transmission length determination as M symbols or M time units, wherein Q and M are positive integers.

Optionally, determining the granularity of the at least one time domain sub-block according to the resource allocation information includes:
- determining the granularity of the at least one time domain sub-block according to the subcarrier spacing in the resource allocation information and the corresponding relationship predefined or configured by a base station between a subcarrier spacing and the granularity of a time domain sub-block;
- or, determining the granularity of the at least one time domain sub-block according to the granularity of a frequency domain resource sub-block in the resource allocation information, and corresponding relationship predefined or configured by the base station between the granularity of the frequency domain resource sub-block and the granularity of a sub-block.

Optionally, the way for determining a number of subcarriers in at least one sub-physical resource block according to the resource allocation information comprises at least one of:

determining the number of subcarriers in the at least one sub-physical resource block according to the information for indicating the number of subcarriers in the at least one sub-physical resource block in the resource allocation information;

determining the number of subcarriers in the at least one sub-physical resource block according to the information for indicating a size of a band width part (BWP) or a size of bandwidth occupied by the BWP in the resource allocation information;

determining the number of subcarriers in the at least one sub-physical resource block according to information for indicating subcarriers spacing and the bandwidth information of the at least one sub-physical resource block in the resource allocation information;

determining the number of subcarriers in the at least one sub-physical resource block according to the information for indicating a number of symbols allocated in time domain for transmission of one transport block or a number of symbols of a time-domain unit in the resource allocation information.

Optionally, determining the frequency domain resource position occupied by one transport block according to the number of subcarriers in the at least one sub-physical resource block includes:

determining the starting position of the frequency domain resource occupied by one transport block according to the number of subcarriers in a first sub-physical resource block of the number of subcarriers in the at least one sub-physical resource block;

determining the size of the frequency domain resource occupied by one transport block according to the number of subcarriers in the second sub-physical resource block of the number of subcarriers in the at least one sub-physical resource block.

Figure 7:
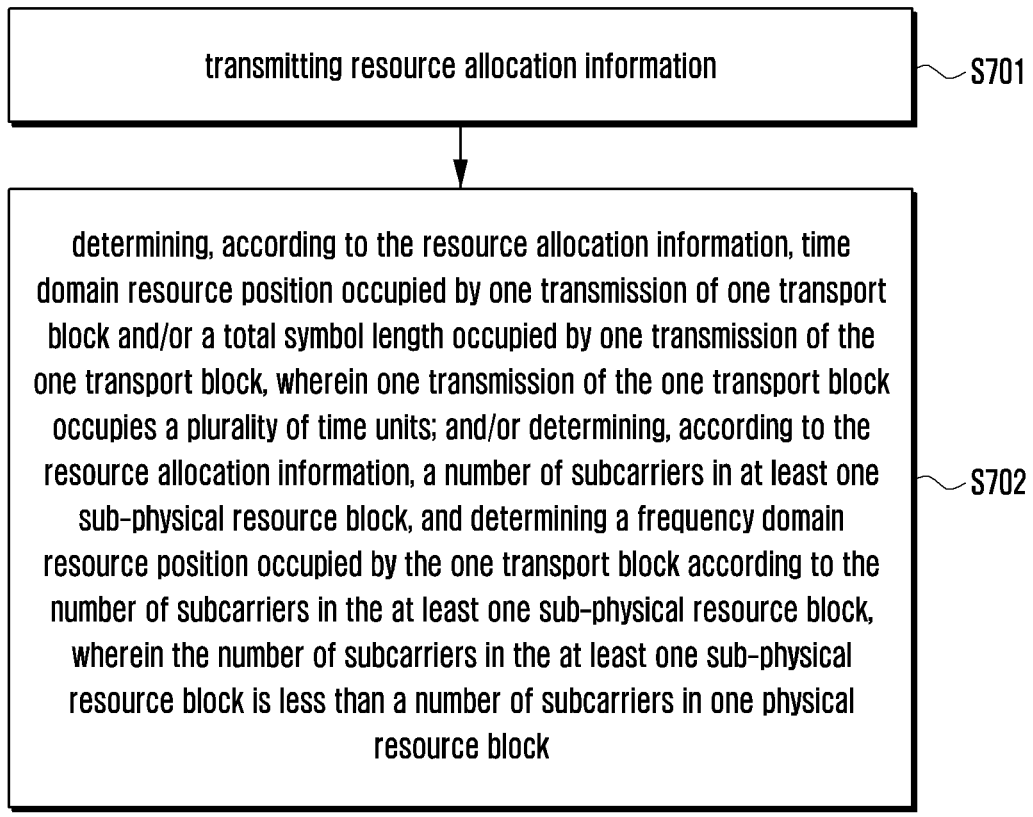
FIG. 7 is a schematic flowchart illustrating another resource determination method provided in an embodiment of the present application.

An embodiment of the present application provides another method for resource allocation, which is applied to a base station. A schematic flowchart of the method is shown in FIG. 7, and the method includes:

Step S701: Transmitting resource allocation information.

Step S702, Determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block.

In an embodiment of the present application, more efficient resource allocation for transmission of the transport block is achieved.

The above-mentioned embodiments of the present application are fully and thoroughly introduced through the following embodiments:

The method of the present application is applicable to downlink channels, uplink channels, or sidelink channels.

In a first aspect, in order to support the transmission of one TB in multiple time units, several methods for supporting time domain resource allocation will be described as follows.

Method 1: The TDRA table indicates the starting symbol position S in the first time unit, the symbol length in the last time unit, and the number n of time units.

Optionally, determining time domain resource position according to the TDRA table and the new parameter n added to each row, wherein n is used to indicate the number of time units occupied by one TB. In another example, the new parameter n may be indicated by additional signaling, wherein the additional signaling includes one or more joint indications such as RRC, MAC, and DCI. Comparing the two methods, the former method can save DCI overhead indicating TDRA, and the latter method can reduce the configuration overhead of TDRA table RRC. The UE determines starting slot position according to the parameter K0 or K2, for indicating the slot position, in the TDRA table, and determines starting symbol position according to the symbol starting position S in the slot in the TDRA table. The UE determines the number of slots occupied by the TB according to the number n of time units occupied in the TDRA table, and determines the number L of symbols occupied in the last slot according to the symbol length L in the TDRA table, wherein the number n of time units may be defined or configured as one of the following:

(A) the number n of time units includes the total number of: starting time unit, the number of complete time unit(s) other than time units for start position and end position, and the number of ending time unit;

(B) the number n of time units only includes the number of time unit(s) other than the time unit for the start position and the end position;

(C) the number n of time units includes the number of complete time units.

Specifically, if S=0 or L is the number of symbols in a time unit, the time unit is included, otherwise the time unit is not included.

Optionally, the time unit may be predefined as several symbols, such as 14 symbols. At this time, a time unit is a slot in an NR system. However, one transmission of one TB may actually occupy some symbols in one slot.

Optionally, the UE calculates the total symbol length L_all occupied by one transmission of the TB according to at least one of: the parameter n indicating the number of time units occupied by a TB, the starting symbol S, the symbol length L, the number 1_unit of symbols in each time unit. The UE calculates the transport block size (TBS) according to the L_all. Specifically, for the above method (A), L_all=1_unitXn−(1_unit−L)−S.

Figure 8:
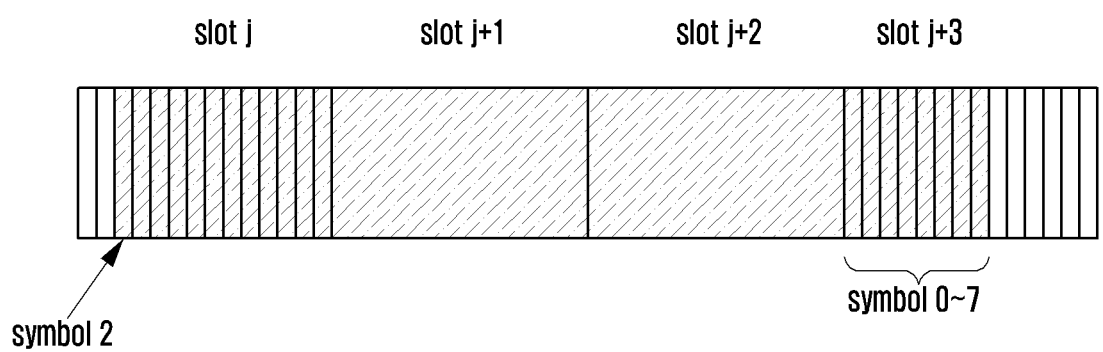
FIG. 8 is a schematic diagram illustrating a resource allocation in time domain provided in an embodiment of the present application.

Optionally, Table 1 is an example of a table of PUSCH resource allocation. For the RRC-configured TDRA table, the starting symbol S and the symbol length L are obtained by indicating SLIV and are calculated according to Formula (1). The UE acquires the TDRA index number used to indicate the time domain resource allocation according to DCI or RRC (for example, for configured grant type 1), which is indicated as index 1 in the Table 1. Then, as shown in FIG. 8, the UE obtains the time domain resource configuration as follows: starting transmission from the third symbol (symbol 2) of the j-th slot after slot of the PDCCH is received, to the 8-th symbol (Symbol 7) position of the j+3 slot. Wherein, the subcarrier spacing of the PUSCH is 15 kHz, and according to a predefined rule, j=1.

At this time, 1_unit=14, and the total number of symbols occupied by the transmission is L_all=14×4−(14−8)−2=48. Table 1 describes an example of TDRA

TABLE 1

| Index | Mapping Type | Position of Time Unit K2 | Starting Symbol S | Symbol Length L | n | Number of Repetition k |
|---|---|---|---|---|---|---|
| 0 | Type B | j | 0 | 14 | 1 | 2 |
| 1 | Type B | j | 2 | 8 | 4 | 2 |
| 2 | Type B | j | 2 | 28 | — | 2 |
| ... | | | | | | |

Method 2: Determine position of the time domain resource allocation according to the starting position of the sub-block indicated by the SLIV (or the starting symbol S and the symbol length L indicated in the TDRA table) and the number n of the sub-blocks. Wherein the number n of sub-blocks may be added to the TDRA table with a new column (a new parameter is added to each index), or may be indicated by additional signaling. The additional signaling includes one or more joint indications such as RRC, MAC, and DCI.

Optionally, one sub-block is defined as L symbols. The number of symbols in a sub-block may be less than or equal to the number of symbols in a time unit.

The SLIV represents the start position and symbol length in a time unit occupied by the first sub-block. The start position in a time unit occupied by the first sub-block and the symbol length may be determined according to the SLIV. In addition, the end position may also be determined according to the start position and the symbol length in a time unit occupied by the first sub-block. The end position may be in the first time unit, or in other time unit, that is, spanning multiple time units. In addition, the time domain positions of other sub-blocks may be inferred according to the predefined rules. It may be achieved by one of the following methods:

Method A: In n consecutive time units, each sub-block occupies the same symbol allocation.

Figure 9:
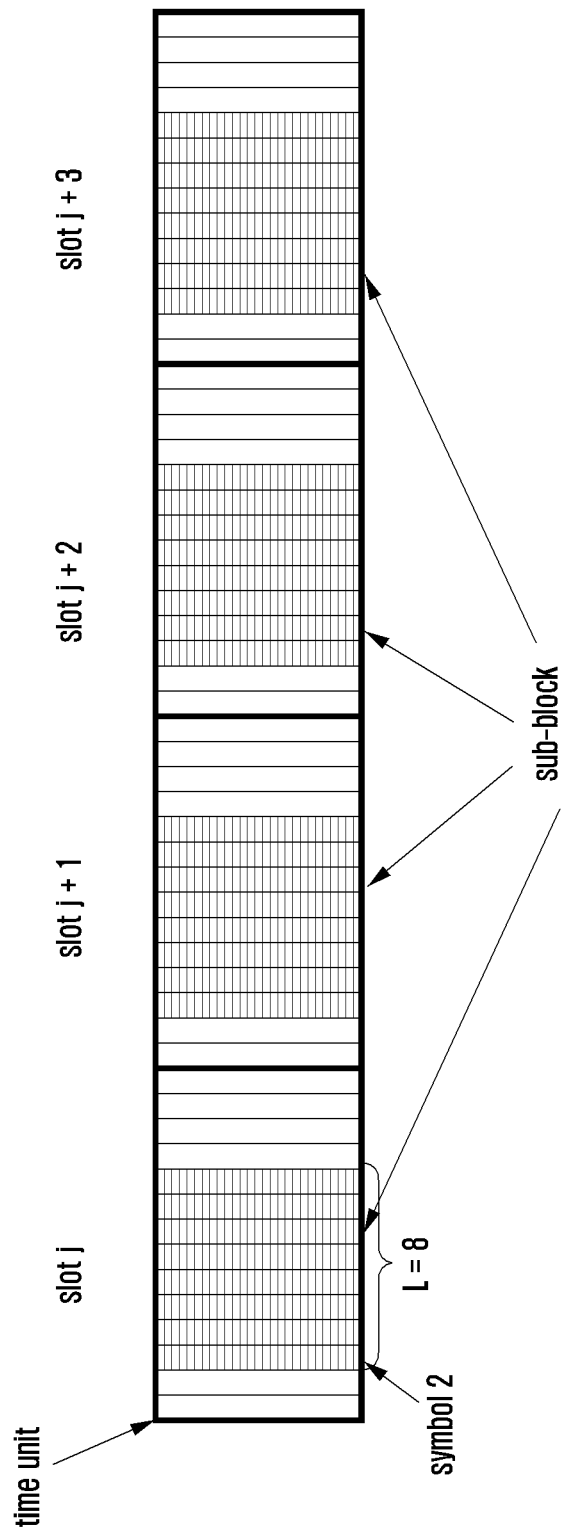
FIG. 9 is a schematic diagram illustrating a resource allocation in time domain provided in an embodiment of the present application.

Optionally, taking index 1 in Table 1 as an example, S=2, L=8, and n=4. As shown in FIG. 9, the TB transmission starts at the third symbol (symbol 2) of slot j for 8 consecutive symbols, and, in slot j+1, slot j+2, and slot j+3, each starts at the third symbol (symbol 2) for 8 consecutive symbols.

Method B: The symbol allocation occupied by the first sub-block may be determined according to the SLIV (or the starting symbol S and the symbol length L indicated in the TDRA table), and the symbols available for uplink or downlink data transmission may be continuously occupied n times, that is, n symbols with length L may be occupied sequentially.

Figure 10:
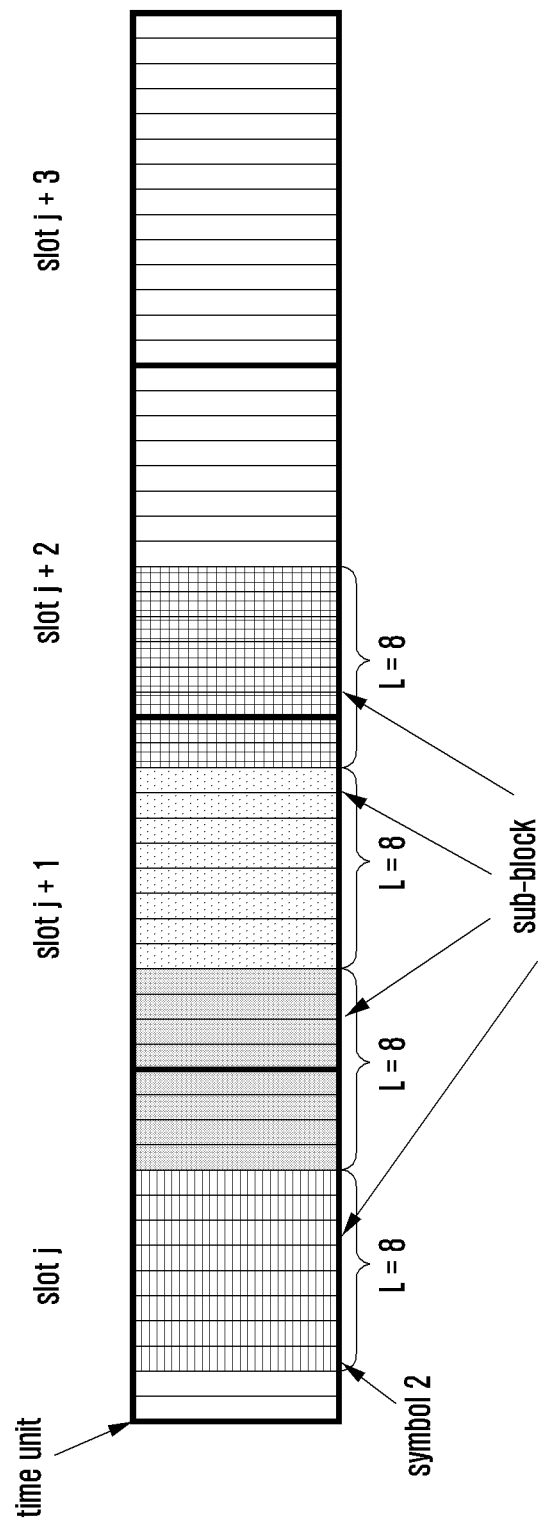
FIG. 10 is a schematic diagram illustrating a resource allocation in time domain provided in an embodiment of the present application.

Optionally, taking index 1 in Table 1 as an example, S=2, L=8, and n=4. As shown in FIG. 10, the TB transmission starts at the third symbol (symbol 2) of slot j for 8 consecutive symbols and on subsequent consecutive n−1 sub-blocks, wherein each sub-block includes 8 symbols. As shown in FIG. 10, the second sub-block occupies symbols 10 to 13 of slot j and symbols 0 to 3 of slot j+1, the third sub-block occupies symbols 4 to 11 of slot j+1, the fourth sub-block occupies symbols 12 to 13 of slot j+1 and symbols 0 to 5 of slot j+2.

Optionally, the UE calculates the total symbol length L_all occupied by one transmission of the TB according to at least one of: the parameter n indicating the number of sub-blocks occupied by one TB, the number L of symbols in each sub-block and the total number of symbols used to transmit the TB may be determined as L_all=L×n. The UE calculates the transport block size (TBS) according to the L_all.

For index 1 in the above Table 1, L_all=L×n=8×4=32 can be calculated.

Method 3: The time unit position K, and the starting symbol position S in the start time unit, and the total symbol length L_all are indicated in the TDRA table, wherein L_all may be greater than the number of symbols in a time unit (such as a slot or a subframe, etc.). In this method, a time unit may be a slot.

There are two specific methods to indicate S and L_all:

Method X: Configuring the TDRA table by RRC, in which the starting symbol position and the total symbol length L_all are respectively configured.

Optionally, configuring S and the total symbol length L_all separately is simpler and more direct. There is no need to introduce additional SLIV calculations that support L_all as about the number of symbols in a time unit. For example, the position of the starting symbol S corresponding to index 3 in Table 1 is 2, and the total symbol length L_all=28. And a slot time unit is 14 symbols, and the total symbol length is about the number of symbols in a time unit.

Method Y: The starting symbol position S and the total symbol length L_all are jointly encoded and indicated in the TDRA table.

Optionally, if the indication of the starting symbol position S is within a time unit (such as a slot or a subframe). At this time, the position of the first time unit occupied by a TB transmission may be additionally indicated in the TDRA table, for example, for PDSCH, K0 indicates the slot at which the transmission starts, and for PUSCH, K2 indicates the slot at which the transmission starts. In an example, if the number of symbols in a slot is 14, and 0≤S<14, the SLIV may be calculated according to the following method:

if L_all ≤ 14,
if L_all+S ≤ 14,
if (L_all−1) ≤ 7
SLIV=14×(L_all−1)+S,
else
SLIV=14×(7−L_all+1)+(7−1−S)
if L_all+S > 14,
if (L_all−1)≤ 7
SLIV=14×(14−L_all+1)+(14−1−S)
else
SLIV=14×(L_all−1)+S
if L_all>14,
SLIV =14×(L_all−1)+S In Method 3, the total number of symbols occupied by one transmission is L_all, which is directly determined according to TDRA or calculated according to SLIV in TDRA.

Optionally, in the foregoing three methods, the time unit may be a slot, and the number of symbols in the sub-block is usually less than or equal to the number of symbols in a time unit. In order to reduce overhead, the number of symbols in a sub-block may be greater than the number of symbols in a time unit (such as a slot). In a Method 4 described below, the base station may configure several symbols and/or several slots as a new sub-block, and then use the sub-block to replace the symbol as the smallest time-domain scheduling resource particle.

Method 4: The UE obtains the granularity of at least one sub-block according to the configuration of the base station; determines the time domain resource position of one TB according to the starting resource position S in the time domain resource indication domain indicated by the base station and the number n of sub-block(s). There are several implementation methods:

Method 1): The granularity of a sub-block obtained by the UE according to the configuration of the base station is L1 symbols or L1 time units (such as slots, etc.). The starting resource position S indicates at which sub-block the transmission starts.

Figure 11:
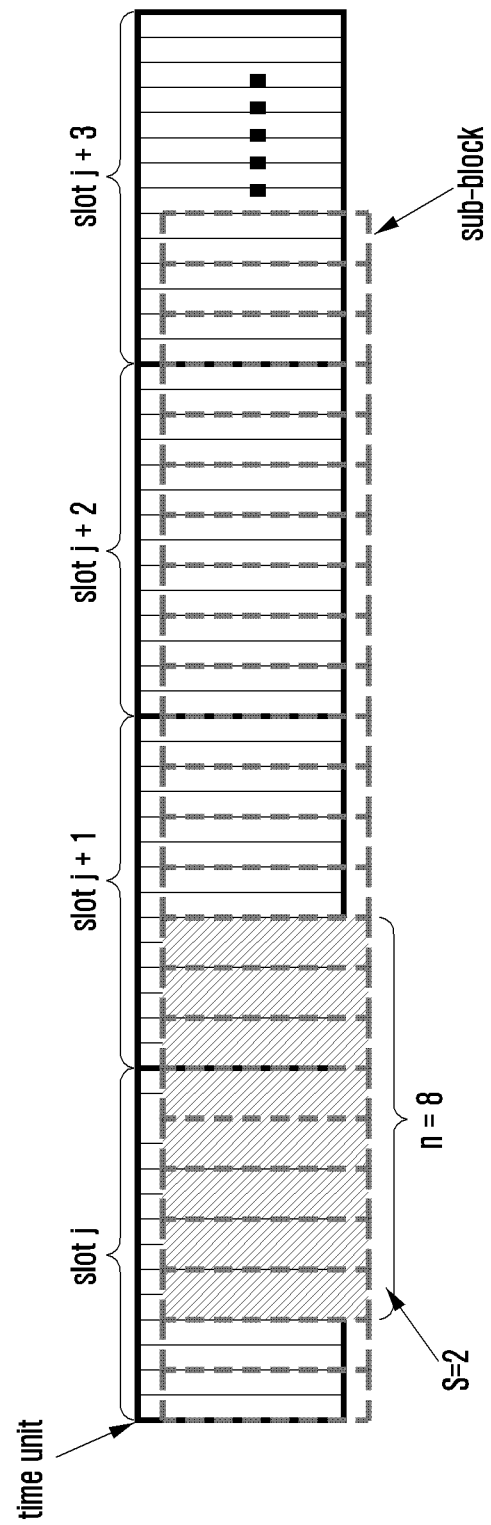
FIG. 11 is a schematic diagram illustrating a resource allocation in time domain provided in an embodiment of the present application.

Optionally, as shown in FIG. 11, the base station configures the granularity L1 of a sub-block as 2 symbols, then S=2 and n=8 represent that one TB transmission starts from the third sub-block and occupies 8 sub-blocks. That is, symbols 4 to 13 of slot j and symbols 0 to 5 of slot j+1 are occupied.

Then the calculation of the total symbol length occupied by one transmission of a TB is determined according to the number of symbol(s) in a sub-block and the number of sub-block(s). When L1 is the number of symbol(s), the total number of symbol(s) is L_all=L1*n. When L1 is the number of slot(s), assuming that there are 14 symbols in a slot, the number of symbols is L_all=14*L1*n.

Method 2): According to the configuration of the base station, the UE obtains the size of a sub-block 1 for determining the starting position to be L1 symbols or L1 time units (such as slots, etc.), and the size of a sub-block 2 for transmission length to be L2 symbols or L1 time units (such as slots, etc.). The starting resource position S indicates at which sub-block 1 the transmission starts. The actual number of transmitted symbol(s) is determined according to the size L2 of sub-block 2.

Figure 12:
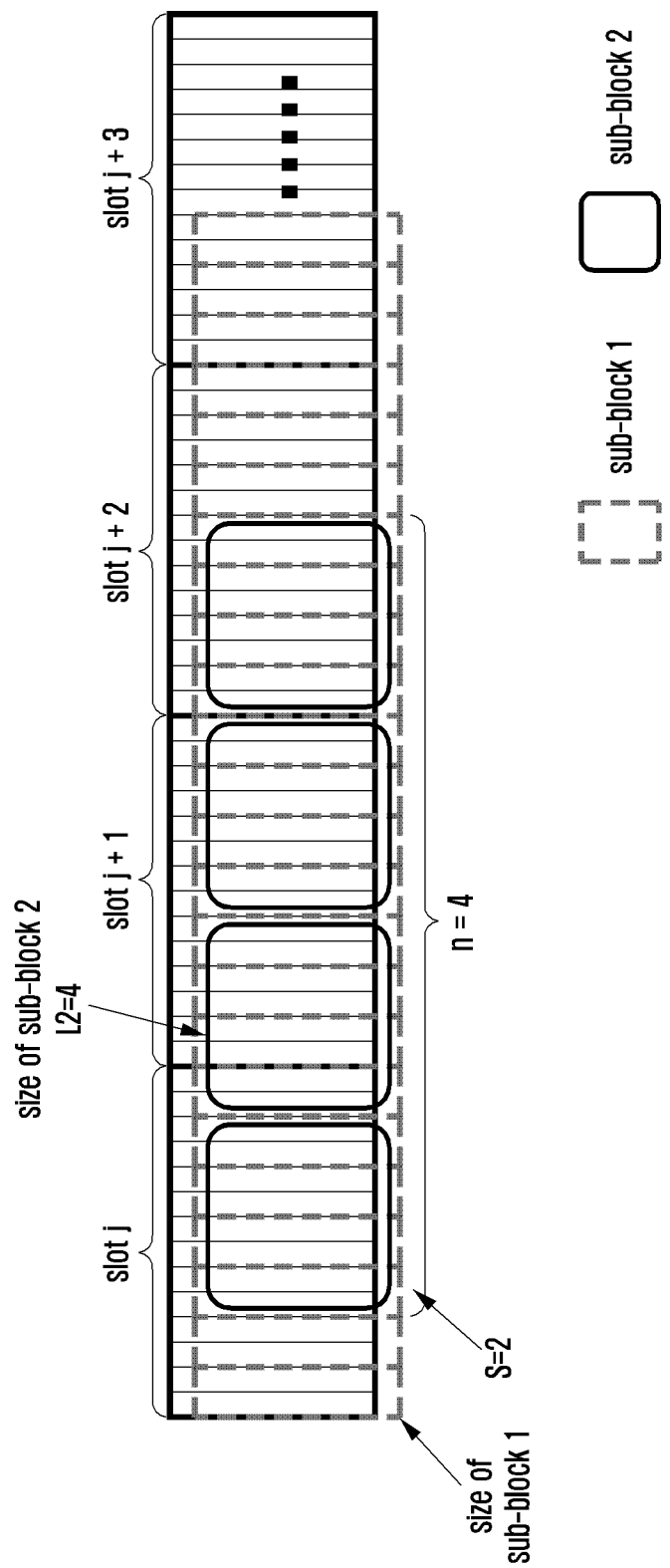
FIG. 12 is a schematic diagram illustrating a resource allocation in time domain provided in an embodiment of the present application.

Optionally, as shown in FIG. 12, the base station configures the size L1 of the sub-block 1 indicating the starting position to be 2 symbols, and the base station configures the size L2 of the sub-block 2 indicating the symbol length to be 8 symbols, then S=2 and n=4 represent one transmission of a TB starts from the third sub-block with length of 2 symbols, and occupies 4 sub-blocks with length of 8 symbols. That is, the symbols 4 to 13 of the slot j and all the symbols of the slot j+1, and the symbols 0 to 7 of the slot j+2.

Then, the calculation of the total symbol length occupied by one transmission of a TB is determined according to the number L2 of symbols in a sub-block and the number n of sub-blocks. When L2 is the number of symbols, the total number of symbols is L_all=L2*n. When L2 is the number of slots, assuming that there are 14 symbols in a slot, the number of symbols is L_all=14*L2*n.

Compared with Method 1), Method 2) can indicate a more flexible starting position.

Optionally, for the above Method 1) and Method 2), the slot j may be determined according to the way for determining the slot position as in the previous methods (e.g., according to K0 or K2 in the TDRA table). Alternatively, the slot j may be directly predefined as the position corresponding to the PDCCH transmission occupied slot or the position of the x-th slot after the corresponding PDCCH transmission occupied slot. Preferably, the slot j is an indication that the corresponding PDCCH transmission occupied slot is more suitable for PDSCH, and the position of the x-th slot after the corresponding PDCCH transmission occupied slot is more suitable for PUSCH indication. Where x may be determined according to the processing capability of the UE and/or the subcarrier spacing.

Optionally, for the above Method 1) and Method 2), S and n may also be jointly encoded. In this way, a time window needs to be defined or configured to calculate SLIV.

Alternatively, for Method 1), when the length of the window is $\bar{L}$ sub-blocks, for the calculation of the SLIV, L in the Formula (1) may be replaced with n, that is:

$$\begin{aligned}&\text{if } n+S \leq \bar{L}, \\ &\quad \text{if } (n-1) \leq L/2 \\ &\quad\quad SLIV = L \times (n-1) + S, \\ &\quad \text{else} \\ &\quad\quad SLIV = \bar{L} \times (\bar{L}/2 - n + 1) + (\bar{L}/2 - 1 - S) \\ &\text{wherein } 0 < n \leq \bar{L} - S, \text{ and } 0 \leq S < \bar{L}.\end{aligned}$$

At this time, one transmission of one TB will be restricted not to span this window. For the case where L1=2 and the window length is 14, it will not span more than 28 symbols.

If it is allowed to span the window, it is simpler to calculate $SLIV = \bar{L} \times (n-1) + S$.

The above calculation idea is also applicable to method 2).

Optionally, the above sub-blocks may be one or more slots. When the subcarrier spacing is large and the symbol length is small, in order to obtain a certain coverage, the uplink transmission needs to last for a constant time. In this case, the UE may configure one sub-block as one or more slots. Since the time of one slot is already short, the number of occupied sub-blocks may be indicated more simply. The starting position may also be indicated by a sub-block or slot. In order to be obtained greater flexibility, the number of transmission sub-blocks and the starting position may be indicated in DCI or RRC with different fields or parameters, respectively.

Method 3): Determining the granularity of a sub-block according to the subcarrier spacing.

Since the subcarrier spacing determines the length of a symbol and a slot, the sub-block size in the above method can be predefined for each subcarrier spacing. As shown in Table 2, the correspondence relationship between the subcarrier spacing and the sub-block size may be predefined in the protocol or configured through signaling. Multiple subcarrier spacings may correspond to the same or different sub-block sizes. For example, 15 kHz~120 kHz all correspond to symbols, while 240 kHz, 480 kHz and 960 kHz correspond to 28, 56, 112 symbol sizes, respectively. The sub-block size may be expressed by time units such as the number of symbols or the number of slots. Table 2 describes correspondence relationship between the subcarrier spacing and the size of a sub-block

TABLE 2

| Subcarrier Spacing | The Number of Symbols in Sub-Block (or The Number of slots in Sub-Block) |
|---|---|
| 15 kHz~120 kHz | 14(1) |
| 240 kHz | 28(2) |
| 480 kHz | 56(4) |
| 960 kHz | 112(8) |

Optionally, the sub-block size is determined according to a configured parameter n and a subcarrier spacing. For example, when the subcarrier spacing is A kHz (e.g., A=120), the sub-block size is n symbols (e.g., n=1), and the subcarrier spacing is m×A kHz (e.g., m=2, A=120, i.e., 240 kHz), the sub-block size is n×m symbols (i.e., n×m=2 symbols).

Optionally, in the protocol, the subcarrier spacing may be expressed by other corresponded parameters, or other parameters used to calculate the subcarrier spacing.

Optionally, because when the subcarrier spacing is large, a PRB in the frequency domain may occupy a large bandwidth. Then, the base station may configure different sizes of frequency domain resource sub-blocks, or the sizes of the frequency domain resource sub-blocks are predefined according to the subcarrier spacing. At this time, the number of symbols of the sub-block in the time domain sub-block may be determined by the number of frequency domain sub-blocks according to a predefined relationship. For example, when the frequency domain sub-block has 1 sub-carrier, the size of the time domain sub-block are 14 symbols; when the frequency domain sub-block has 2 subcarriers, the size of the time domain sub-block are 7 symbols, etc. Then, when the base station indicates a size of frequency domain sub-block to the UE, the size of the time domain sub-block size may be inferred correspondingly. Alternatively, when the base station indicates the size of the time domain sub-block to the UE, the size of the frequency-domain sub-block may be inferred correspondingly.

Optionally, the granularity of the sub-blocks may be configured for uplink or downlink or sidelink data transmission and/or control channel transmission, respectively. That is, the same or different sub-block granularities may be configured.

Optionally, for the above methods, the UE may also determine the data transmission mapping type (Type A and Type B) according to the indication in the TDRA table. In particular, for this new resource allocation method, only one of multiple transmission types may be predefined or configured (additional configuration).

Optionally, although the transmission of one transport block spans multiple time units, in order to achieve better coverage or higher reliability, repetitions may be further introduced. The number of repetitions may be configured separately, or as shown in Table 1, an item of repetition number k is added to the TDRA table to be jointly indicated with other time domain resource allocation information.

In the second aspect: frequency domain resource allocation

In NR, there are two methods for frequency domain resource allocation:

Type 0 Resource Allocation Method: According to the predefined criteria and/or the configuration of the base station, a frequency domain resource with a given bandwidth is divided into several resource block groups (RBG), and then one or several resource block groups occupied by TB transmission is indicated through the way of bitmap. Each resource block group includes one or more physical resource blocks (PRB) or virtual resource blocks (VRB). The number of physical resource blocks included in each resource block group is defined or configured according to the size of the given bandwidth. Optionally, Table 3 shows the RBG values corresponding to different BWP bandwidths. The base station configures one of two configurations by RRC. Table 3 describes RGB value corresponding to different BWP bandwidths or the number of subcarriers in a sub-block

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Type 1 Resource Allocation Method: in a unit of VRB or PRB, and using resource indication value (RTV) to indicate the starting position of resource RB_start and the length of continuous resource block L_RBs The resource indication value RIV is calculated using the Formula (1) and Formula (2).

For large subcarrier spacing, since the bandwidth occupied by one subcarrier may be hundreds of kilohertz (kHz) or even hundreds of megahertz (MHz), especially for power-limited uplink transmission, rather than distributing power in a large bandwidth, it may be better to concentrate on a small bandwidth for power spectrum density (PSD) boosting. The same or better coverage may be achieved while saving spectrum resources through PSD boosting. This can support more users.

Optionally, a smaller frequency domain resource block may be defined, such as a partial resource block (sub-PRB, sub-physical resource block) method for frequency domain resource allocation. A sub-PRB may have one or more subcarriers. The base station may configure the number of subcarriers in a sub-PRB to the UE. Or the UE may derive it according to different subcarrier spacings based on the protocol. Specifically, there are the following methods:

Method 1: The base station directly configures the number of subcarriers in a sub-PRB to the UE through signaling (such as RRC, MAC, DCI, etc.). For example, the number of subcarriers in a sub-PRB is directly configured to the UE.

Method 2: Determining the number of subcarriers in the sub-PRB according to the size of the BWP (the number of frequency domain resource blocks occupied in the BWP), or the size of the bandwidth (in Hz) occupied by the BWP. Optionally, the number of subcarrier in one or more corresponding groups of sub-PRB may be defined or configured for the number of frequency domain resource blocks occupied by at least two BWPs or the bandwidth occupied by at least two BWPs. When defining or configuring multiple groups of the number of subcarriers, the base station may indicate to the UE one of the multiple groups of the number of subcarriers through signaling (such as one of DCI, MAC, or RRC).

Optionally, as shown in Table 3, when the BWP occupies 50 PRBs, the number of subcarriers in one sub-PRB has two groups, where the first group has 4 subcarriers and the second group has 8 subcarriers. The base station may further indicate to the UE that the first configuration (i.e., the first group) has 4 subcarriers.

Method 3: The bandwidth of a Sub-PRB (e.g., in Hz) is predefined or configured by the base station to the UE, and the number of subcarriers in a Sub-PRB is determined according to the subcarrier spacing and the bandwidth of the Sub-PRB.

Optionally, the bandwidth of a sub-PRB is configured to 1.44 MHz, for a subcarrier spacing of 120 kHz, a sub-PRB may have 1.44 MHz/120 kHz=12 subcarriers; for a subcarrier spacing of 240 kHz, a sub-PRB may have 1.44 MHz/240 kHz=6 subcarriers; for a subcarrier spacing of 480 kHz, one sub-PRB may have 1.44 MHz/480 kHz=3 subcarriers; for a subcarrier spacing of 1.44 Hz, one sub-PRB may have one subcarriers of 1.44 MHz, and so on.

Method 4: Calculating the number of subcarriers in a sub-PRB according to the number of symbols allocated in the time domain resource for transmitting a TB or the number of symbols in a time domain unit.

Optionally, the total number of REs in a scheduling resource (for example, 144 REs) is predefined or configured, and the number of subcarriers in a sub-PRB and the number of symbols in a time domain unit (or the number of symbols allocated in the time domain resource transmitted by a TB) are multiplied to obtain the total number of REs in the scheduling resource. For example, if the total number of REs in a scheduling resource is 168 REs and the number of symbols in a time domain unit is 28, the number of subcarriers in the sub-PRB is 168/28=6.

Optionally, in the above Methods 1 to 4, the number of subcarriers in the Sub-PRB may be replaced with the number of RBs, or the number of RBGs, so that a larger bandwidth may be allocated at one time, thereby bit overhead required by time domain resource allocation is reduced. At this time, its characteristics may be named super resource block group (super RBG). In the above Method 4, symbols in the time domain may be replaced with time units in other time domains, such as a set of symbols, a slot, a subframe, and the like.

For frequency domain resource allocation, one of the two Methods (Type 0 or Type 1) in NR resource allocation may be applied. The same may be applied to other resource allocation methods. Here, one frequency domain resource scheduling unit is one or more Sub-PRBs (or one or more super RBGs).

Optionally, in the Type 2 frequency domain resource allocation method, it is necessary to indicate the starting frequency domain resource position and the occupied resource size. In this case, different granularities may be used for indication. For example, any one of the above Methods 1-4 is used to determine the granularity of the first frequency domain (such as a sub-PRB or a PRB or a super RBG), so as to indicate the starting position of the frequency domain resources occupied by one transmission. Using any one of the above Methods 1-4 to determine the granularity of the second frequency domain (for example, a sub-PRB or a PRB or a super RBG), so as to indicate the size of the frequency domain resource occupied by one transmission.

The technical solution provided in the embodiments of the present application has at least the following beneficial effects:
more efficient resource allocation for transmission of the transport block is achieved.

Figure 13:
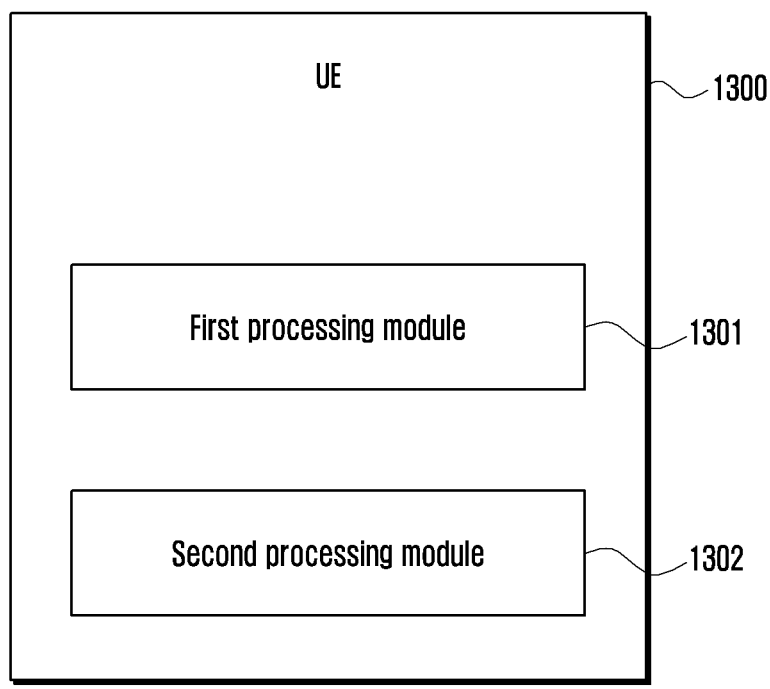
FIG. 13 is a structure diagram illustrating a UE provided in an embodiment of the present application.

Based on the same inventive concept of the Embodiment 1, an embodiment of the present application further provides a UE. A schematic structural diagram of the UE is shown in FIG. 13. The UE 1300 includes a first processing module 1301 and a second processing module 1302.

The first processing module 1301 is configured to receive resource allocation information;

The second processing module 1302 is configured to determine, according to the resource allocation information, time domain resource position occupied by one transmission of one transport block and/or a total symbol length occupied by one transmission of the one transport block, wherein one transmission of the one transport block occupies a plurality of time units; and/or, The second processing module 1302 is configured to determine, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block.

Optionally, the resource allocation information comprises at least one of information indicating a number of time units occupied by one transport block, position information of a first time unit, starting position information, length information, a number of symbols in each time unit, a granularity of at least one time domain sub-blocks a number of time domain sub-blocks, a time domain resource allocation TDRA table for indicating information of resource allocation in time domain, and an index in the TDRA table to indicate the information of resource allocation in time domain, subcarrier spacing, a granularity of frequency domain resource sub-block, information of a number of subcarriers in at least one sub-physical resource block, a size of a bandwidth part (BWP), and size of bandwidth occupied by BWP.

Optionally, the starting position information comprises position information of a start symbol in a time unit; the length information comprises length information of a symbol; the granularity of a sub-block comprises at least one symbol or at least one time unit;

Optionally, the configuration information comprises information, for indicating transmission scheduling, configured to the UE by a base station through radio resource control RRC; the scheduling information comprises information, for indicating transmission scheduling, transmitted to the UE by the base station through downlink control information DCI.

Optionally, the number of time units is defined or configured as any of the following:
the number of time units includes the number of starting time unit, the number of complete time unit(s) other than time units for start position and end position, and the number of ending time unit;
the number of time units includes the number of time units other than the time units occupied by the start position and the end position;
the number of time units includes the number of complete time units.

Optionally, the determining, according to the resource allocation information, time domain resource position occupied by one transmission of one transport block and/or total symbol length occupied by one transmission of the one transport block, comprises at least one of:
determining the time domain resource position occupied by one transmission of the one transport block and/or the total symbol length occupied by one transmission of the one transport block, according to the starting symbol position of the transport block on a first time unit, symbol length on a last time unit and a number of time units, included in the resource allocation information;
determining the total symbol length according to at least one of following included in the resource allocation information: a parameter for indicating a number of time units occupied by one transport block, starting position information, length information, a number of symbols in each time unit, and a number of time domain sub-blocks, wherein the starting position information and the length information are indicated separately or jointly indicated;
determining the time domain resource position occupied by one transmission of the one transport block and the total symbol length occupied by one transmission of the one transport block, according to the starting position information, the length information and the number of the time domain sub-blocks included in the resource allocation information, wherein the starting position information and the length information indicates position and symbol length of a starting symbol in a time unit occupied by a first time domain sub-block;
determining the total symbol length according to at least one of following included in the resource allocation information: a parameter for indicating a number of time domain sub-blocks occupied by one transport block and a number of symbols in each time domain sub-block;

determining a granularity of the at least one time domain sub-block according to the resource allocation information, and determining time domain resource position occupied by one transport block according to the starting position information and a number of at least one time domain sub-blocks, included in the time domain resource allocation information.

Optionally, determining time domain positions of the time domain sub-blocks other than the first time domain sub-block according to the predefined rule(s) and at least one of a position of starting symbol, a symbol length, and a position of ending symbol in the first time-domain sub-block.

Optionally, the predefined rules include at least one of the following:

in consecutive N time units, each time domain sub-block occupies a same symbol allocation, wherein N is a positive integer;

determining symbol allocation occupied by the first time domain sub-block according to the starting position information and the length information, and occupying subsequently symbols available for data transmission N times continuously.

Wherein, each sub-block occupies the same symbol allocation, the symbol allocation includes the same starting position and symbol length.

Wherein, the symbols available for the data transmission include any one of symbols that can be used for uplink data transmission, symbols that can be used for downlink data transmission, and symbols that can be used for sidelink data transmission.

Optionally, the way for indicating the starting symbol position in the first time unit and/or the total symbol length occupied by one transmission of the transport block comprises at least one of:

configuring the TDRA table by radio resource control RRC, for configuring the starting symbol position and the total symbol length occupied by one transmission of the transport block;

jointly encoding the starting symbol position and the total symbol length occupied by one transmission of the transport block and indicating in the TDRA table.

Optionally, determining at least one time domain sub-block according to the resource allocation information, wherein determining at least one time domain sub-block according to the resource allocation information comprises:

determining, according to the resource allocation information, a size of a time domain sub-block as L symbols or L time units, wherein L is a positive integer;

determining the granularity of the at least one time domain sub-block according to the time domain resource allocation information, including:

determining, according to the resource allocation information, a granularity of a first time domain sub-block for a starting position determination as Q symbols or Q time units, and a granularity of a second time domain sub-block for a transmission length determination as M symbols or M time units, wherein Q and M are positive integers.

Optionally, determining the granularity of the at least one time domain sub-block according to the resource allocation information includes:

determining the granularity of the at least one time domain sub-block according to the subcarrier spacing in the resource allocation information and the corresponding relationship predefined or configured by a base station between a subcarrier spacing and the granularity of a time domain sub-block;

or, determining the granularity of the at least one time domain sub-block according to the granularity of a frequency domain resource sub-block in the resource allocation information, and corresponding relationship predefined or configured by the base station between the granularity of the frequency domain resource sub-block and the granularity of a sub-block.

Optionally, the way for determining a number of subcarriers in at least one sub-physical resource block according to the resource allocation information comprises at least one of:

determining the number of subcarriers in the at least one sub-physical resource block according to the information for indicating the number of subcarriers in the at least one sub-physical resource block in the resource allocation information;

determining the number of subcarriers in the at least one sub-physical resource block according to the information for indicating a size of a band width part (BWP) or a size of bandwidth occupied by the BWP in the resource allocation information;

determining the number of subcarriers in the at least one sub-physical resource block according to information for indicating subcarriers spacing and the bandwidth information of the at least one sub-physical resource block in the resource allocation information;

determining the number of subcarriers in the at least one sub-physical resource block according to the information for indicating a number of symbols allocated in time domain for transmission of one transport block or a number of symbols of a time-domain unit in the resource allocation information.

Optionally, determining the frequency domain resource position occupied by one transport block according to the number of subcarriers in the at least one sub-physical resource block includes:

determining the starting position of the frequency domain resource occupied by one transport block according to the number of subcarriers in a first sub-physical resource block of the number of subcarriers in the at least one sub-physical resource block;

determining the size of the frequency domain resource occupied by one transport block according to the number of subcarriers in the second sub-physical resource block of the number of subcarriers in the at least one sub-physical resource block.

The technical solution provided in the embodiments of the present application has at least the following beneficial effects:

Receiving resource allocation information; Determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block. The present application achieves more efficient resource allocation for transmission of the transport block.

For the content not detailed in the UE provided in the embodiment of the present application, reference may be made to the above resource determination method. The beneficial effects that the UE provided in the embodiment of the present application can achieve are the same as the above resource determination method, which will not be repeated here.

Figure 14:
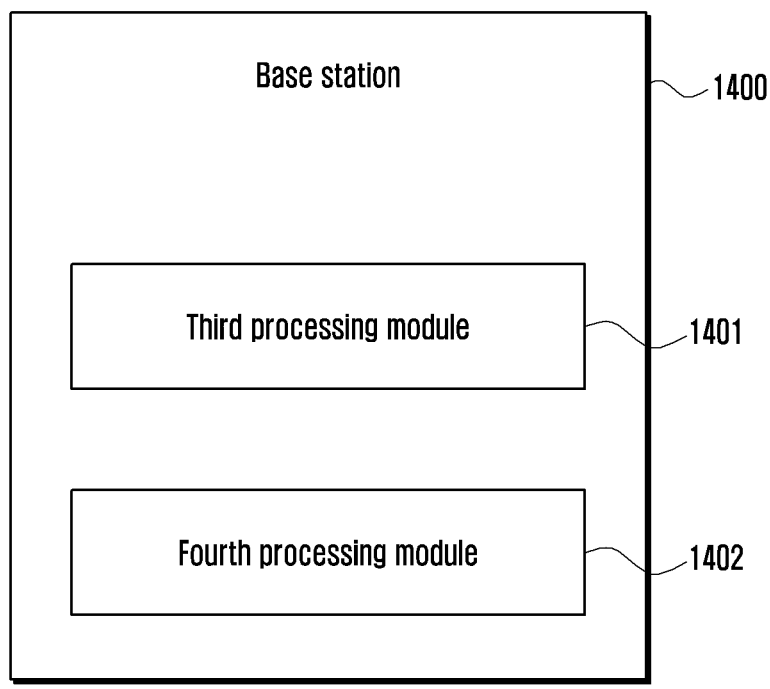
FIG. 14 is a schematic diagram illustrating a base station provided in an embodiment of the present application.

Based on the same inventive concept of the Embodiment 1, an embodiment of the present application further provides a base station. A schematic structural diagram of the base station is shown in FIG. 14. The base station 1400 includes a third processing module 1401 and a fourth processing module 1402.

The third processing module 1401 is configured to transmit resource allocation information;

The fourth processing module 1402 is configured to determine, according to the resource allocation information, time domain resource position occupied by one transmission of one transport block and/or a total symbol length occupied by one transmission of the one transport block, wherein one transmission of the one transport block occupies a plurality of time units; and/or, the fourth processing module 1402 is configured to determine according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block.

The technical solution provided in the embodiments of the present application has at least the following beneficial effects:

more efficient resource allocation for transmission of the transport block is achieved.

For the content not detailed in the base station provided in the embodiment of the present application, reference may be made to the above resource determination method. The beneficial effects that the base station provided in the embodiment of the present application can achieve are the same as the above resource determination method, which will not be repeated here.

Figure 15:
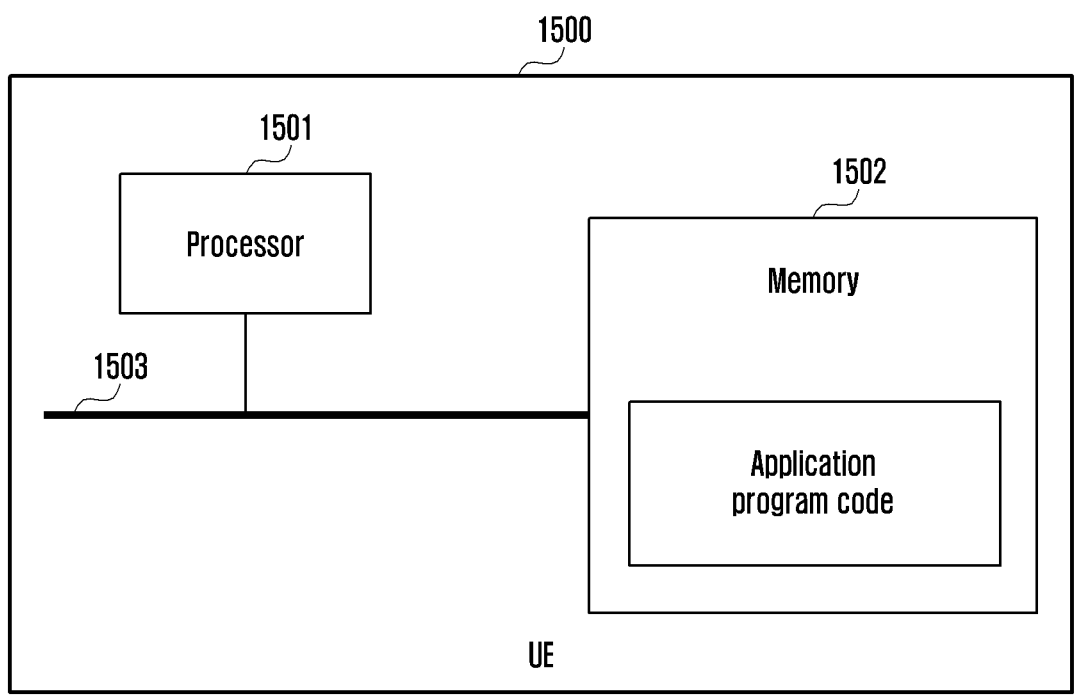
FIG. 15 is a structure diagram illustrating a UE provided in an embodiment of the present application.

Based on the same inventive concept, an embodiment of the present application further provides a UE. A schematic structural diagram of the UE is shown in FIG. 15. The UE 1500 includes at least one processor 1501, a memory 1502, and a bus 1503. Each of the at least one processor 1501 is electrically connected to the memory 1502; the memory 6002 is configured to store at least one computer-executable instruction, and the processor 1501 is configured to execute the at least one computer-executable instruction, so as to execute any one of the embodiments of the Embodiment 1 of this application or steps of any one of the resource determination methods provided in any one of the optional embodiments.

Further, the processor 1501 may be a Field-Programmable Gate Array (FPGA) or other devices with logic processing capabilities, such as a Microcontroller Unit (MCU) and a Central Process Unit (CPU).

Applying the embodiments of the present application has at least the following beneficial effects:

receiving resource allocation information; determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block. The present application achieves more efficient resource allocation for transmission of the transport block.

Figure 16:
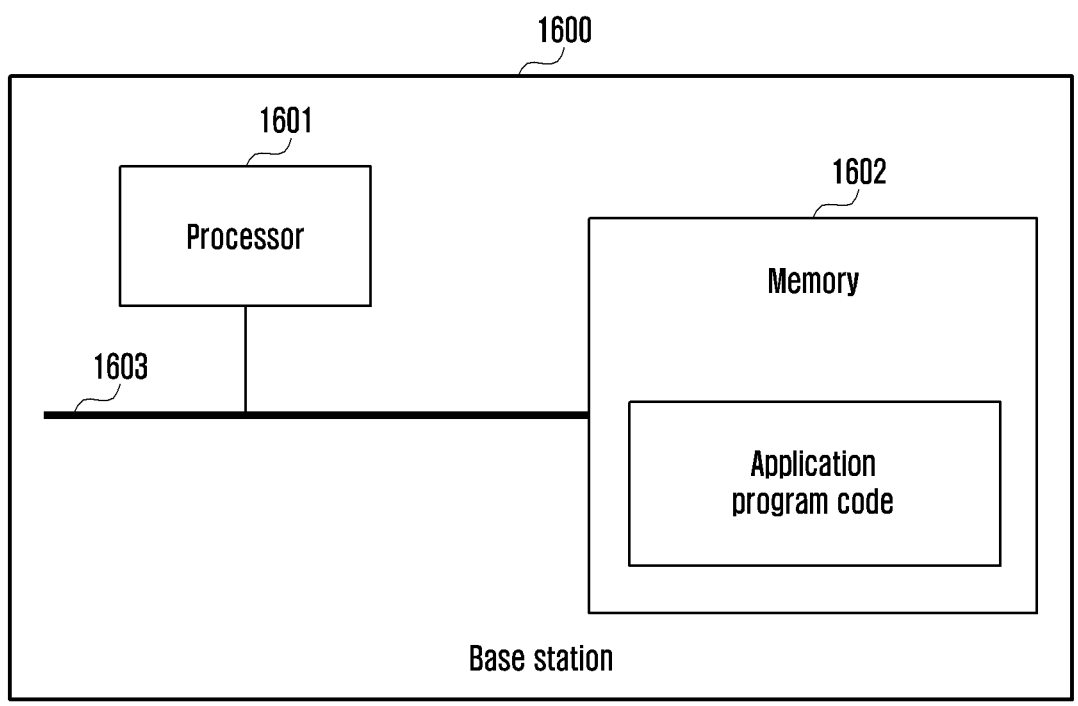
FIG. 16 is a schematic diagram illustrating a base station provided in an embodiment of the present application.

Based on the same inventive concept, an embodiment of the present application further provides a base station. A schematic structural diagram of the base station is shown in FIG. 16. The base station 1600 includes at least one processor 1601, a memory 1602, and a bus 1603. Each of the at least one processor 1601 is electrically connected to the memory 1602; the memory 1602 is configured to store at least one computer-executable instruction, and the processor 1601 is configured to execute the at least one computer-executable instruction, thereby executing any one of the Embodiments 1 of the present application or steps of the method for determining a resource provided in any one of the optional embodiments.

Further, the processor 1601 may be a Field-Programmable Gate Array (FPGA) or other devices with logic processing capabilities, such as a Microcontroller Unit (MCU) and a Central Process Unit (CPU).

Application of the embodiments of the present application has at least the following beneficial effects:

transmitting resource allocation information; determining, according to the resource allocation information, time domain resource position occupied by one transmission of one transport block and/or a total symbol length occupied by one transmission of the one transport block, wherein one transmission of the one transport block occupies a plurality of time units; and/or, determining, according to the resource allocation information, a number of subcarriers in at least one sub-physical resource block, and determining a frequency domain resource position occupied by the one transport block according to the number of subcarriers in the at least one sub-physical resource block, wherein the number of subcarriers in the at least one sub-physical resource block is less than a number of subcarriers in one physical resource block. The present application achieves more efficient resource allocation for transmission of the transport block.

Embodiment 2

In some scenarios, in order to improve coverage performance, AL needs to be further increased. However, if the AL of a PDCCH is large and is mapped in a CORESET region, then the probability of PDCCH blocking may increase. In order to reduce PDCCH blocking, the present disclosure proposes to disperse L1 CCEs of one PDCCH into a plurality of CORESET regions (or referred to as "disperse into a plurality of SS regions"), so that in one CORESET or SS region (hereinafter referred to as SS region), only part of the resources are occupied by the same PDCCH, leaving the remaining resources for the PDCCHs of other UEs.

Figure 17:
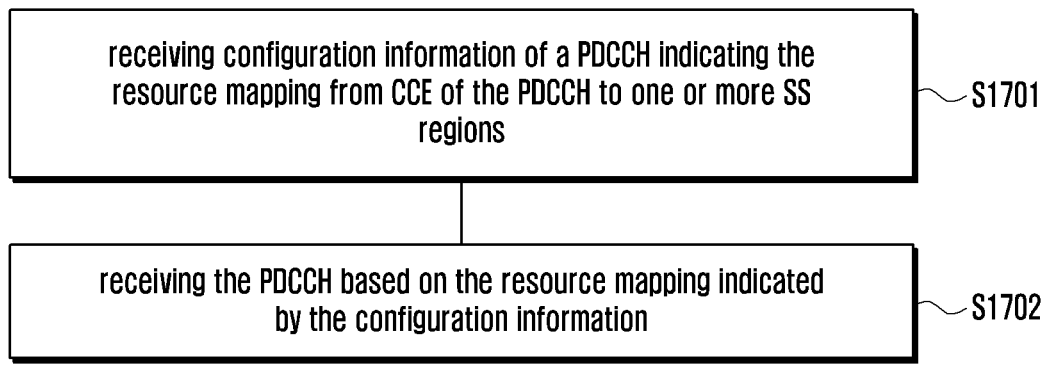
FIG. 17 shows an exemplary communication method according to the present disclosure.

FIG. 17 shows an exemplary communication method according to the present disclosure. As shown in FIG. 17, in step S1701, the UE receives configuration information of a downlink control channel (PDCCH) sent by the base station. The UE determines, based on the received configuration information, mapping information on a mapping relationship between a CCE and a REG and/or a mapping relationship between a CCE and a REG mapped to an SS region in an SS-bundle, where an SS-bundle includes a plurality of SS regions. The above information may be directly included in the configuration information of the PDCCH, or may be obtained based on parameters included in the configuration information of the PDCCH, for example, by calculation. The configuration information of the PDCCH is indicated by a broadcast message MIB, or by system information SIB, or by a high-level signaling common to the cell or dedicated to the UE. In step S1702, the UE receives the PDCCH sent by the base station, based on the mapping relationship determined based on the configuration information.

For some special purpose PDCCH configuration, for example, the mapping relationship between the CCE and the REG and/or the mapping relationship between the CCE and the REG mapped to the SS region in the SS-bundle, is predefined in the standard. For example, the configuration of the PDCCH scheduling system message SIB1 is predefined in the standard.

CCE/REG to SS Mapping

According to an embodiment of the present disclosure, L1 CCEs of one PDCCH may be distributed to a plurality of SS regions. Based on whether a CCE is distributed to a plurality of SS regions, it may be divided into two methods.

According to the present disclosure, a plurality of SS regions form an SS-bundle. A plurality of SS regions mapped by one PDCCH belong to the same SS-bundle. Alternatively, the size $N\_ss$ of the SS-bundle is determined based on a repetition number R of the PDCCH, or based on a maximum value Rmax that the repetition number R may take, or configured by the base station.

According to an embodiment, one CCE can only be mapped to one SS region, and different CCEs may be scattered and mapped to $R\_r$ SS regions, where $R\_r \geq 1$. Regardless of whether the value of $R\_r$ is equal to 1 or greater than 1, all REGs included in one CCE are located in the same SS region. For example, the mapping information included in the PDCCH sent by the base station to the UE indicates that a plurality of CCEs are sequentially mapped to one or more SS regions in the SS-bundle, where each CCE is mapped to one SS region. In the SS region, CCE/REG mapping may be implemented according to the method described above, for example, the way of interleaving based on REG bundle is performed in one SS region.

Figure 18:
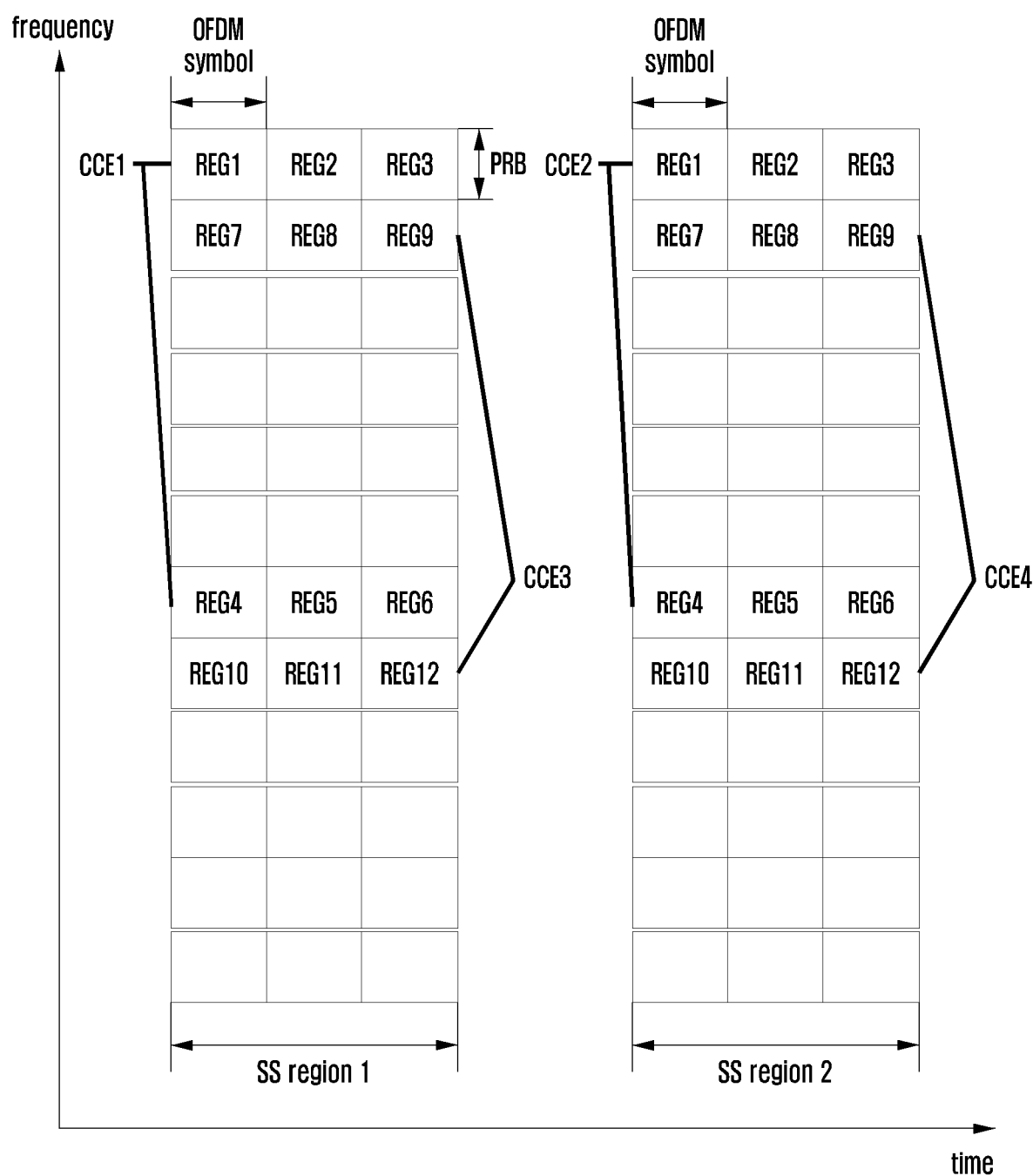
FIG. 18 shows an exemplary mapping from CCE/REG to SS region.

An implementation to map a plurality of CCEs to $R\_r$ SS regions is to generate L1 CCEs, and then map the L1 CCEs to the SS regions in turn. For one PDCCH, a total of L1 CCEs are included. After DCI bit is subjected to modulation and coding rate matching, L1 CCE-length symbol sequences are obtained. Then, this symbol sequence is mapped to the $R\_r$ SS regions. FIG. 18 shows the mapping from CCE/REG to SS region according to this example. In the example shown in FIG. 18, L1=4, after DCI bit is subjected to modulation and coding rate matching, a symbol sequence of 4 CCE lengths (including CCE1 to CCE4) is obtained, and then this symbol sequence is mapped to 2 SS regions (SS region 1 and SS region 2).

According to this example, the $R\_r$ SS regions may be taken as a whole, and the starting point of a PDCCH candidate may be determined based on all CCE resources of the $R\_r$ SS regions. For example, there are 20 CCEs in each SS region, and a total of 40 CCEs in 2 SS regions. CCEs may be numbered on the 2 SS regions in the time-before-frequency order, for example, the first CCE in SS region 1 is CCE1, the first CCE in SS region 2 is CCE2, the second CCE in SS region 1 is CCE3, ..., the $10^{th}$ CCE in SS region 1 is CCE19, and the $10^{th}$ CCE in SS region 2 is CCE20. When L1=4, the starting point of the first PDCCH candidate is CCE1, and the starting point of the second PDCCH candidate is CCE5.

Another implementation to map a plurality of CCEs to $R\_r$ SS regions is to generate L3 CCEs, and then map the L3 CCEs to each SS region of the $R\_r$ SS regions. Generally, $L1=L3*R\_r$, where $R\_r=R$ is called the number of repetitions. For one PDCCH, after DCI bit is subjected to modulation and coding rate matching, L3 CCE-length symbol sequences are obtained, which are mapped to 1 SS region, and the L3 CCE-length symbol sequences are repeated in the other $R\_r-1$ SS regions, respectively. That is, L1 CCEs include repetitions of a CCE subset (L3 CCEs), and the number of repetitions is equal to the number of the SS regions in the SS-bundle. The mapping information included in the PDCCH sent by the base station to the UE indicates that the CCE subset (L3 CCEs) is mapped to one SS region, and the CCE subset is repeatedly mapped to each of the other SS regions.

Figure 19:
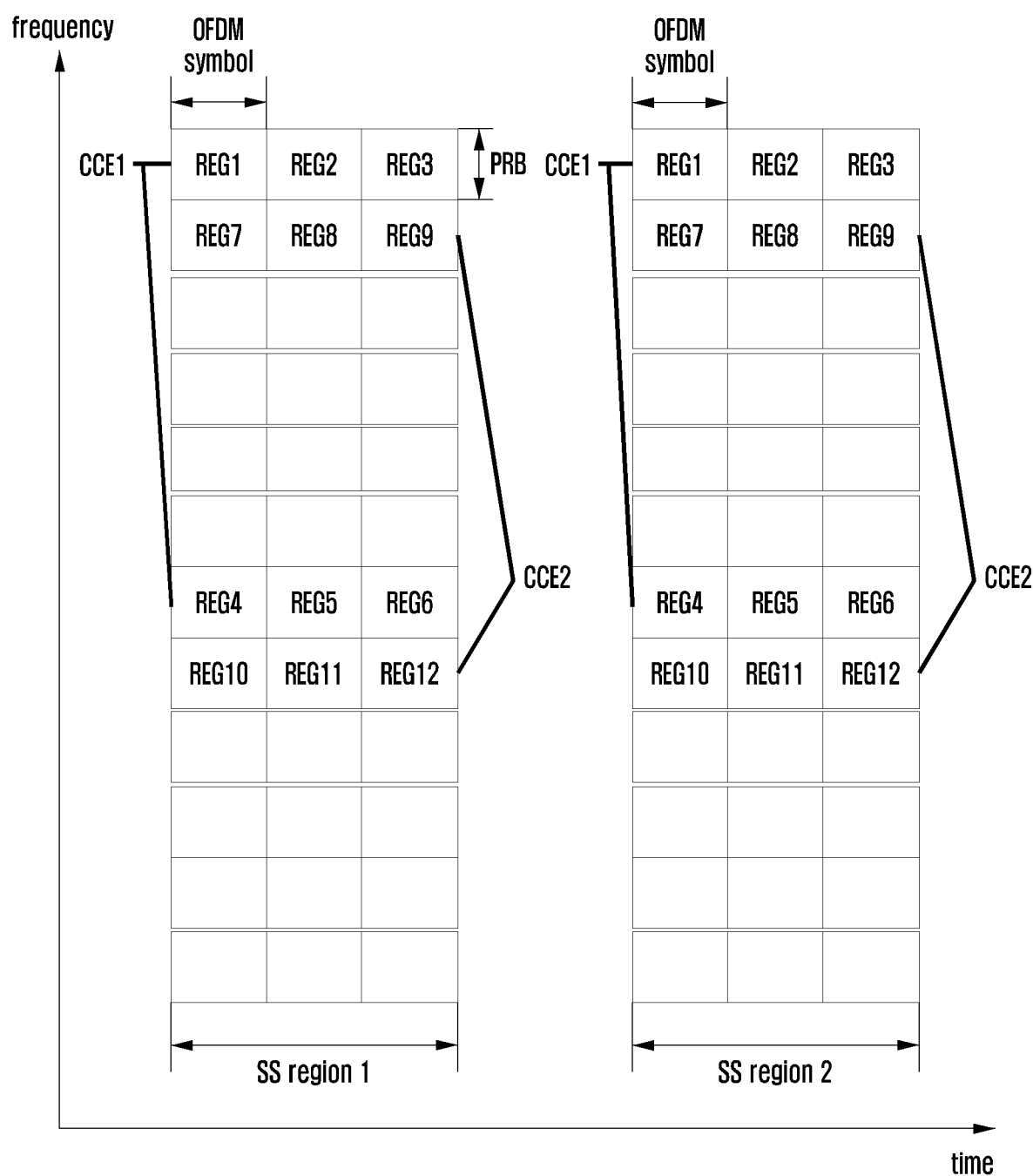
FIG. 19 shows an exemplary mapping from CCE/REG to SS region.

FIG. 19 shows the mapping from CCE/REG to SS region according to this example. In the example shown in FIG. 19, L1=4, L3=2, and $R\_r=2$. As shown in FIG. 19, for one PDCCH, after DCI bit is subjected to modulation and coding rate matching, L32 CCE-length symbol sequences are obtained, which are mapped to 1 SS region, and the L3=2 CCE-length symbol sequences are repeated in the other SS region.

According to this example, the starting point of the PDCCH candidate is determined based on the CCE resources in an SS region. Specifically, the starting point of the PDCCH candidate is determined based on the CCE resources in the first SS region in an SS-bundle, or may be determined based on the CCE resources in the first, $R\_r+1$, $2*R\_r+1$ ... SS region in an SS-bundle, respectively.

For example, the size of an SS-bundle may be determined according to Rmax=4. There are 20 CCEs in each SS region and a total of 80 CCEs in 4 SS regions. For the PDCCH with R=2 and L3=2, based on the 20 CCEs in the first SS region in the SS-bundle it determines the starting point position of the first PDCCH candidate as the first CCE in the first SS region. This PDCCH candidate occupies the first CCE in the first SS region and the first CCE in the second SS region. The starting point position of the second PDCCH candidate is the third CCE in the first SS region. This PDCCH candidate occupies the third CCE in the first SS region and the third CCE in the second SS region.

Alternatively, the base station may configure whether the same precoding matrix is used for PDCCH repeated samples in the SS regions in an SS-bundle. For example, if the number of repetitions of the PDCCH is R=2, a PDCCH signal of the PDCCH in two SS regions uses the same precoding matrix. Alternatively, the base station may configure whether REGs at the same frequency domain position in the SS regions in an SS-bundle use the same precoders matrix. Alternatively, the base station may configure whether the same beam is used for the PDCCH signals in the SS regions in an SS-bundle.

Alternatively, the base station may configure whether the same precoding matrix is used for the PDCCH repeated samples in $R\_ss$ SS regions in an SS-bundle. The value of R_ss is configured by the base station, and $R\_ss \leq N\_ss$. Alternatively, the base station may configure the REGs at the same frequency domain position in the R_ss SS regions in an SS-bundle to use the same precoding matrix. For example, an SS-bundle includes 4 SS regions, and R_ss=2 means that the first and second SS regions have the same precoding matrix, and the third and fourth SS regions have the same precoding matrix. Alternatively, the base station may configure whether the PDCCH signals in the R_ss SS regions in an SS-bundle use the same beam.

Alternatively, if the base station does not configure precoding characteristics of the SS regions, the UE cannot assume that the same precoding matrix is used for the PDCCH repeated samples in the SS regions.

Alternatively, if the base station does not configure beam characteristics of the SS regions, the UE cannot assume that the same beam is used for the PDCCH repeated samples in the SS regions.

According to another embodiment of the present disclosure, one CCE may be mapped to N_ss SS regions, and a plurality of CCEs may be mapped to N_ss SS regions, where N_ss≥1.

In this example, the N_ss SS regions in one SS-bundle are used as a whole, and L2 REGs of one CCE are mapped to the N_ss SS regions in the SS-bundle. When a plurality of SS regions are continuous in time or close to each other, a joint interpolation of the DMRSs of the plurality of SS regions may improve channel estimation performance. For example, the size of the REG bundle is set to the sum of the number of OFDM symbols in the plurality of SS regions. When the plurality of SS regions are far apart in time, the joint interpolation of the DMRSs of the plurality of SS regions has no significant gain. The size of the REG bundle may be set as the number of OFDM symbols in one SS region, however, a plurality of CCEs in one PDCCH are mapped to different SS regions to obtain a time diversity gain.

Figure 20:
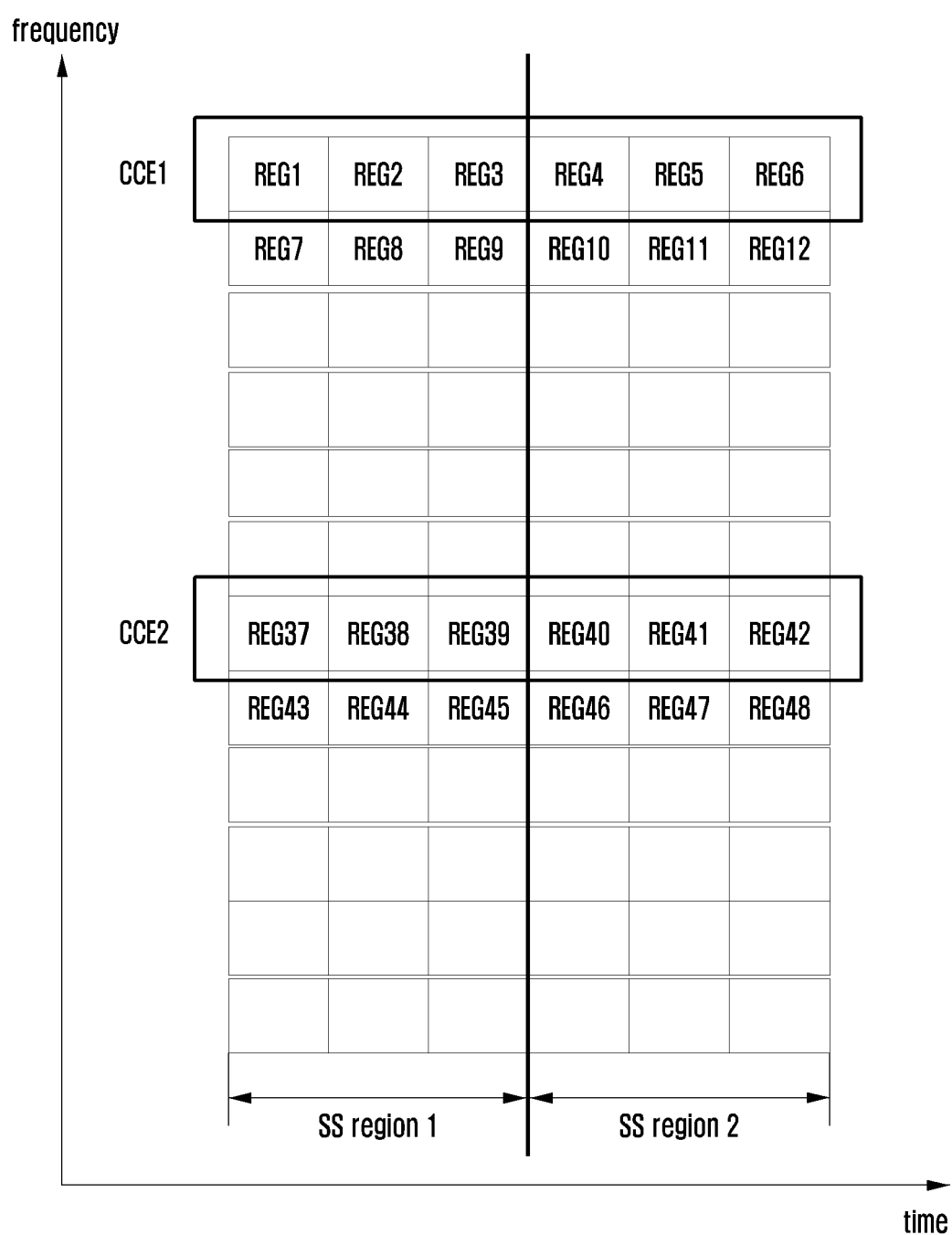
FIG. 20 shows an exemplary mapping from CCE/REG to SS region.

FIG. 20 shows the mapping from CCE/REG to SS region according to this example. In the example shown in FIG. 20, assuming that the length of a CORESET symbol is 3, an SS-bundle includes 2 SS regions (SS region 1 and SS region 2). Then, the REG is within 6 symbols, which may be numbered according to the rule of time before frequency. CCE1 includes REG1~REG6. Assuming that the size of the REG bundle is L=6. If mapping is performed in the interleaving method, assuming that the interleaving factors R_r=2, AL=2, according to formula (1), CCE1 and CCE2 correspond to REG1~6 and REG37~42, respectively. If mapping is performed based on the interleaving method, CCE1 and CCE2 correspond to REG1~6 and REG7~12, respectively.

As shown in FIG. 20, the size of the REG bundle is L=3, assuming that the interleaving factors R_r=2, AL=2, according to formula (1), CCE1 corresponds to REG1~3 and REG37~39, CCE2 corresponds to REG4~6 and REG40~42.

Alternatively, the total number of OFDM symbols in the N_ss SS regions is an integer multiple of the number L2 of REGs included in one CCE, or is evenly divisible by L2.

Alternatively, the total number of OFDM symbols in the N_ss SS regions is an integer multiple of the size L of the REG bundle, or is divisible by L.

Alternatively, when configuring the SS, the base station configures which of the above methods to determine the REG/CCE mapping method. The base station may determine the most appropriate mapping method based on the time resource of the SS. Or, the base station may determine the REG/CCE mapping method according to a predefined rule, for example, a specific SS corresponds to a specific REG/CCE mapping method.

To achieve the same effects as those of the present embodiment, the existing CORESET symbol length may be increased. The symbol length of the existing CORESET is 1, 2, or 3. In order to support larger PDCCH AL or PDCCH repetition, the symbol length of the CORESET may be increased, for example, up to 6 symbols. In one SS region, CCE/REG mapping is performed, that is, all CCEs of one PDCCH are mapped in one SS region.

Alternatively, the starting point of each SS region or PDCCH MO is determined based on the configured SS time resource. The OFDM symbols occupied by each SS region is jointly determined by the CORESET symbol length and semi-statically configured uplink and downlink resources. One implementation is to map the CORESET to semi-statically configured downlink symbols and flexible symbols based on the configured starting point and the semi-statically configured uplink and downlink resources. For example, the base station configures the starting point of the SS time resource in a slot as OFDM symbol 1, OFDM symbol 7 (for example, monitoringSymbolsWithinSlot indicates 10000010000000), and the CORESET symbol length is 6, assuming that the uplink and downlink symbols in slot 1 are configured as DDDDDDDDFUUUUU, the uplink and downlink symbols in slot 2 are configured as DDDDDDDDDDDDDD, then, the first SS region is symbols 1 to 6 of slot 1, and the second SS region is symbols 7 and 8 of slot 1, and symbols 1 to 4 of slot 2. Another implementation is to determine the starting point and ending point of the SS region based on the configured starting point and the CORESET symbol length, where symbols that are semi-statically configured as uplink resources are not available and a PDCCH cannot be sent. In the above example, the first SS region is symbols 1 to 6 of slot 1, and the second SS region is symbols 7 and 8 of slot 1.

Relationship Between SS-Bundle and SS Resource Period

In order to reduce time delay, SS regions that are continuous or close in time should be combined into one SS-bundle as much as possible. The SS regions are sorted in chronological order, namely SS region 1, 2, 3, 4 . . . . An S bundle of the size Rmax includes SS regions j, j+1, . . . j+Rmax-1, where j satisfies (j-1) mod Rmax 0 (j starts counting from 1).

Alternatively, the SS regions forming one SS-bundle belongs to the same SS.

Alternatively, the SS regions forming one SS-bundle may belong to different SSs, for example, an SS-bundle includes 4 SS regions, and these 4 SS regions belong to SSs of SS index 1, SS index 2, SS index 3, and SS index 4, respectively. A plurality of SS indexes corresponding to one SS-bundle are configured by the base station. Specially, for one SS-bundle, the base station configures only 1 SS, then the SS regions belong to the same SS. Also, for example, the SS index of the SS regions in an SS-bundle may be determined according to a predefined rule. For example, according to the chronological order, 4 adjacent SS regions form an SS-bundle, and the SS to which the 4 SS regions belong is determined based on the configured SS index and time resource. Further, only specific SSs can be combined to form the SS-bundle. For example, SS regions of a plurality of SSs having the same SS type can be combined to form an SS-bundle. For example, the SS type is UE specific SS, Type-0 Common search space (CSS), etc.

Alternatively, the SS regions forming one SS-bundle may be associated with a plurality of CORESETs. The plurality of CORESETs corresponding to one SS-bundle may be configured by the base station, or the plurality of CORESETs and SSs corresponding to one SS-bundle may be configured by the base station. Also, for example, according to a predefined rule, the CORESETs, or CORESETs and SSs of the SS regions in an SS-bundle are determined. Further, only specific CORESETs, or CORESETs and SSs can be combined to form an SS-bundle.

According to an example, the size of each SS-bundle is the same, and SS regions located within two periods cannot form an SS-bundle. For example, assuming that the period of an SS is 10 slots, and the SS includes the $1^{st}$ to $2^{nd}$ symbols and the $7^{th}$ to $8^{th}$ symbols of each slot in the $1^{st}$ to $3^{rd}$ slots in each period, that is, the time resources of the SS are the $1^{st}$ to $2^{nd}$ symbols and the $7^{th}$ to $8^{th}$ symbols of each slot in slots 1 to 3, slots 11 to 13, slots 21 to 23, slots 31 to 33 . . . . Every two adjacent symbols are an SS region. Then, in one period, there are 6 SS regions. Assuming that an SS-bundle includes 4 SS regions, then SS-bundle 1 is the first 4 SS regions in the first period, and SS-bundle 2 is the first 4 SS regions in the second period. The remaining 2 SS regions in each period cannot be combined with the SS regions of the next period to form an SS-bundle.

According to another example, in order to make full use of each SS region, the length of each SS-bundle may be different, for example, it may be adjusted based on the number of remaining SS regions in one period. In the above example, SS-bundle 1 may be the first 4 SS regions in the first period, and SS-bundle 2 may be the last 2 SS regions in the first period. SS-bundle 3 may be the first 4 SS regions in the second period, and SS-bundle 4 may be the last 2 SS regions in the second period. In an SS-bundle the number of repetitions of the PDCCH is less than or equal to the number of SS regions included in the SS-bundle. For example, SS-bundle 1 may include R_r=1, 2 or 4 PDCCH candidates, and SS-bundle 2 may include R_r=1 or 2 PDCCH candidates.

Alternatively, the UE assumes that the number of SS regions in each period configured by the base station is an integer multiple of the size of the SS-bundle. Thus, it may be ensured that the length of each SS-bundle is the same, thereby avoiding the above-mentioned problem that the lengths of the SS-bundles are different.

According to another example, the size of each SS-bundle is the same, and the SS regions located within two periods may form an SS-bundle. In the above example, SS-bundle 1 may be the first 4 SS regions in the first period, SS-bundle 2 may be the last 2 SS regions in the first period and the first 2 SS regions in the second period, and SS-bundle 3 may be the last 4 SS regions in the second period. In a specific implementation, the base station may avoid scheduling the PDCCH to be mapped to SS regions belonging to different periods. Taking SS-bundle 2 as an example, for a PDCCH, the number of repetitions of which is 2, the base station may send this PDCCH in the last 2 SS regions in the first period, or send this PDCCH in the first 2 SS regions in the second period.

According to another example, in order to obtain a time diversity gain, SS regions that are not continuous in time may be combined to an SS-bundle. The time interval of the SS regions may be configured by the base station. For example, an SS-bundle includes 4 SS regions, and the time interval of the SS regions is 1 slot. Assuming that the time resources of the SS are the $1^{st}$ to $2^{nd}$ symbols and the $7^{th}$ to $8^{th}$ symbols of each slot in slots 1~4, slots 11~14, slots 21~24, slots 31~34 . . . . Then, the SS regions of the $1^{st}$ to $2^{nd}$ symbols of each slot in slots 1 to 4 form SS-bundle 1, the SS regions of the $7^{th}$ to $8^{th}$ symbols of each slot in slots 1 to 4 form SS-bundle 2, the SS regions of the $1^{st}$ to $2^{nd}$ symbols of each slot in slots 11 to 14 form SS-bundle 3, . . . , and so on.

Relationship Between SS-Bundle and Slot Format Dynamic Indicator

In order to avoid indicating DCI of uplink and downlink resources, for example, reception error of slot format indicator SFI (SFI) leads to confusion of an SS-bundle. It may be determined which SS regions form an SS-bundle based on semi-statically configured time resource, regardless of dynamic indicator SFI. The semi-statically configured time resource is the SS time resource. Alternatively, the semi-statically configured time resource further includes at least one of a cell common uplink and downlink configuration, a UE-specific uplink and downlink configuration, or a rate match pattern (RateMatchPattern). For example, the SS-bundle is determined based on the maximum number of repetitions Rmax that can be supported. If Rmax=4, an SS-bundle includes 4 adjacent SS regions. A semi-static signaling may configure the time resource of one SS to be the $1^{st}$ to $2^{nd}$ symbols (SS region 1), the $5^{th}$ to $6^{th}$ symbols (SS region 2), the $9^{th}$ to $10^{th}$ symbols (SS region 3), and the $13^{th}$ to $14^{th}$ symbols (SS region 4) in a slot. Regardless of whether the SFI does not indicate that one or more of the 4 SS regions belong to downlink symbols, an SS-bundle includes these 4 SS regions.

According to an implementation, the UE assumes that all OFDM symbols in the SS regions in an SS-bundle are available, regardless of whether the SFI indicates that these OFDM symbols are downlink symbols. The UE needs to monitor the PDCCH in these SS regions based on the configuration of the base station.

According to an implementation, if part or all of the OFDM symbols in one or more SS regions in an SS-bundle are not indicated by the SFI as downlink symbols, for example, are indicated as uplink symbols or flexible symbols, the UE will consider that these resources are not available. If part of the resources corresponding to one PDCCH mapped to this SS-bundle are not available, the UE does not need to monitor this PDCCH. For example, referring to the example of FIG. 22, if the SFI indicates that the SS region 3 and the SS region 4 belong to flexible symbols, then according to the method for determining an SS based on repeated PDCCH shown in FIG. 22, in this SS-bundle the UE does not need to monitor PDCCH candidates with a repetition count of 4, because the SS regions 3 and 4 to which the PDCCH candidates with the repetition number of 4 mapped are not available. Similarly, the UE does not need to monitor PDCCH candidates with a repetition count of 2 and whose starting point are in the SS region 3, and PDCCH candidates with a repetition count of 1 and whose starting point are in the SS region 3 or 4.

According to another implementation, if part or all of the OFDM symbols in one or more SS regions in an SS-bundle are not indicated as downlink symbols by the SFI, for example, are indicated as uplink symbols or flexible symbols, the UE considers that these resources are not available. If part of the resources corresponding to one PDCCH mapped to this SS-bundle are not available, the UE still needs to monitor this PDCCH, but it is assumed that the base station does not send corresponding PDCCH signals on these resources. For example, referring to the example of FIG. 22, if the SFI indicates that the SS region 3 belongs to a flexible symbol, then according to the method for determining an SS based on repeated PDCCH shown in FIG. 22, if the base station configures the UE to monitor a PDCCH candidate with AL=4 and R_r=4 in the SS-bundle the UE still needs to monitor this PDCCH candidate, and the UE assumes that the base station only sends corresponding PDCCH signals in the SS regions 1, 2, and 4, similar to that the PDCCH signal on the SS region 3 is punctured.

According to another implementation, when the number of repetitions is greater than a predefined threshold, for example, R_r>1, regardless of whether part or all of the OFDM symbols in one or more SS regions in the SS-bundle are indicated by the SFI as downlink symbols, the UE considers that these resources are available. The UE still tries to monitor the PDCCH on these resources. Alternatively, the threshold is configurable, for example, by the base station. Alternatively, the threshold is predefined by the base station.

Further, considering that different SS or CORESET application scenarios are different, how to process an SS region including uplink signals or flexible signals may be different. The base station may configure the CORESET or SS to use either of the above methods, or may predefine which type of SS to use which method by standard.

In order to avoid confusion of an SS-bundle caused by reception error of SFI, according to another implementation, semi-statically configured SS resources, which are configured by the base station, do not belong to semi-statically configured uplink symbols or flexible symbols, but only belong to downlink symbols. Accordingly, the UE may also determine the SS region based on the same assumption. SFI cannot rewrite semi-statically configured downlink symbols, and the UE does not expect a configured SS region to be indicated by the SFI as an uplink symbol or flexible symbol. Further, regardless of whether the UE receives an SFI, the UE considers the configured SS region as a valid resource.

Figure 21:
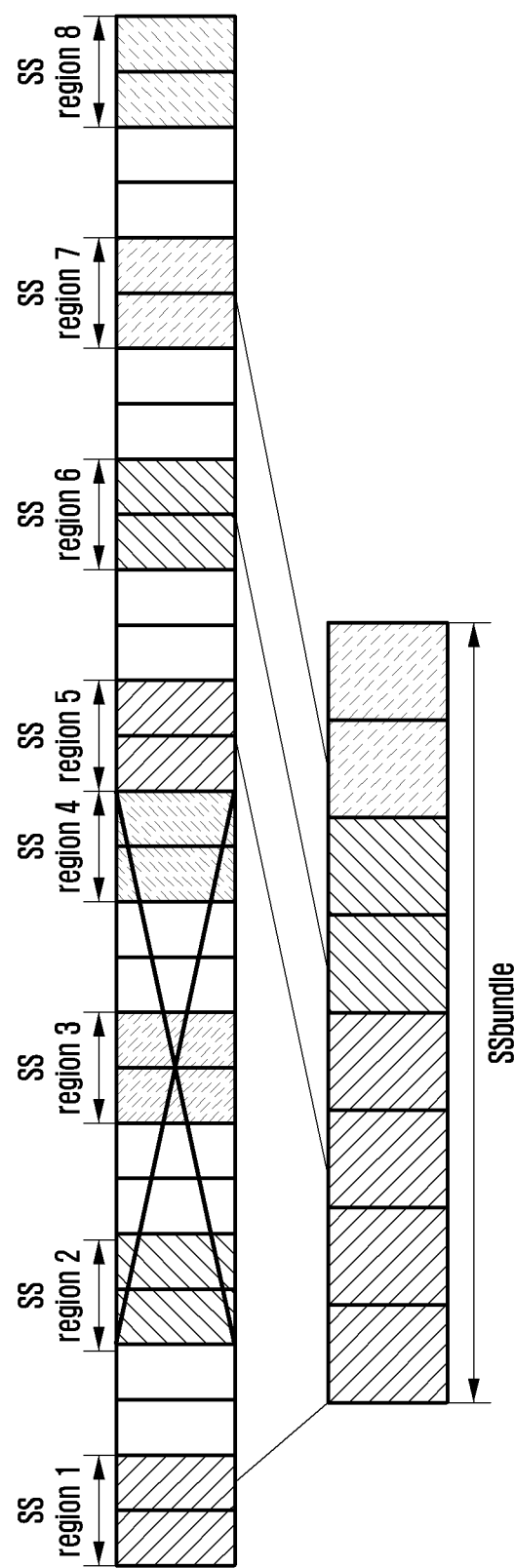
FIG. 21 shows an example of SS regions forming an SS-bundle.

According to an embodiment of the present disclosure, in order to improve the flexibility of control channel resource allocation, it may be determined whether a semi-statically configured SS region is valid according to a specific DCI indication, and an SS bundle is formed based on valid SS regions. If part or all of the OFDM symbols in one or more SS regions in an SS bundle are not indicated by the SFI as downlink symbols, for example, are indicated as uplink symbols or flexible symbols, the UE considers that these resources are not available and considers SS regions including these resources as invalid. For example, the SS bundle is determined based on the maximum number of repetitions Rmax that can be supported. If Rmax=4, an SS-bundle includes 4 adjacent SS regions. As shown in FIG. 21, the SFI indicates that SS region 2 to SS region 4 are flexible symbols. Then, the SS bundle includes SS region 1, SS region 5, SS region 6, and SS region 7, these are four valid SS regions.

For an SS, the starting point of its SS-bundle may be determined based on the time domain resource of the SS and the maximum number of repetitions Rmax. Further, the starting point of the SS-bundle may also be determined based on a reference time domain resource. For example, taking the reference time domain resource as the starting point, the first SS region of the SS's most recent time resource is recorded as SS region 1. The SS regions of the SS are sorted in chronological order, respectively as SS regions 1, 2, 3, 4, 5, 6, 7, 8 . . . . The starting point of each SS-bundle is SS region j, where j satisfies (j−1) mod Rmax=0. It is not difficult to see that in the two methods described above, one is to determine a valid SS region index based on semi-statically configured SS parameters, and the other is to determine a valid SS region index based on semi-statically configured SS parameters and the SFI.

In order to achieve a compromise between flexibility and robustness in control channel resource allocation, for example, for a specific search space or CORESET, which SS regions form an SS-bundle may be determined based on a semi-statically configured SS, regardless of SFI indications. The specific search space is, for example, a Common search space (CSS), or a specific CSS, for example, for receiving SFI PDCCH, SI-RNTI scrambled PDCCH, RA-RNTI scrambled PDCCH and/or P-RNTI scrambled PDCCH CSS, or a specific CORESET, for example, CORESET0. For other search spaces or CORESETs, for example, a UE specific search space (USS), which SS regions form an SS-bundle may be determined based on the semi-static configuration and the SFI.

In addition, if part or all frequency domain resources of part or all OFDM symbols in one or more SS regions in an SS-bundle are indicated as unavailable for PDCCH transmission, the UE considers that these resources are not available. For example, part of the frequency domain resources is used for synchronizing signal/broadcast channel block SS/PBCH Block, or are indicated as reserved resources, then these resources are not available for PDCCH transmission. If part of the resources corresponding to a PDCCH are not available, the UE still needs to monitor the PDCCH, but it is assumed that the base station does not send corresponding PDCCH signals on these resources. For example, assuming that in 4 SS regions in an SS-bundle, part of the PRBs of SS region 2 are indicated as SS/PBCH Block resources. If a PDCCH is mapped to these resources, the UE receives this PDCCH and assumes that the base station does not send a PDCCH signal on these resources. Or, the UE still needs to detect this PDCCH, but the UE does not monitor PDCCH repeated samples in the SS regions including these unavailable resources. For example, assuming that in 4 SS regions in an SS-bundle part of the PRBs of SS region 2 are indicated as SS/PBCH Block resources. If a PDCCH with the number of repetitions being 4 is mapped to the 4 SS regions, the UE receives this PDCCH on the SS regions 1, 3, 4, assuming that there are no repeated samples of this PDCCH on SS region 2. Or, the UE does not need to monitor this PDCCH. For example, assuming that in 4 SS regions in an SS-bundle, part of the PRBs of SS region 2 are indicated as SS/PBCH Block resources. If a PDCCH with the number of repetitions being 4 is mapped to the 4 SS regions, the UE does not try to receive this PDCCH.

The method for forming an SS-bundle described above is applicable to the two methods of REG/CCE mapping described in the present disclosure.

PDCCH Candidate Position Determination Method

To map a PDCCH to an SS-bundle, it is necessary to determine how to map R_r times to which SS regions in the SS-bundle according to a predefined method. For convenience of description, this method is referred to herein as a method for determining an SS based on repeated PDCCH. The method for determining an SS based on repeated PDCCH involves how to determine the starting point of a PDCCH candidate in an SS-bundle.

Figure 22:
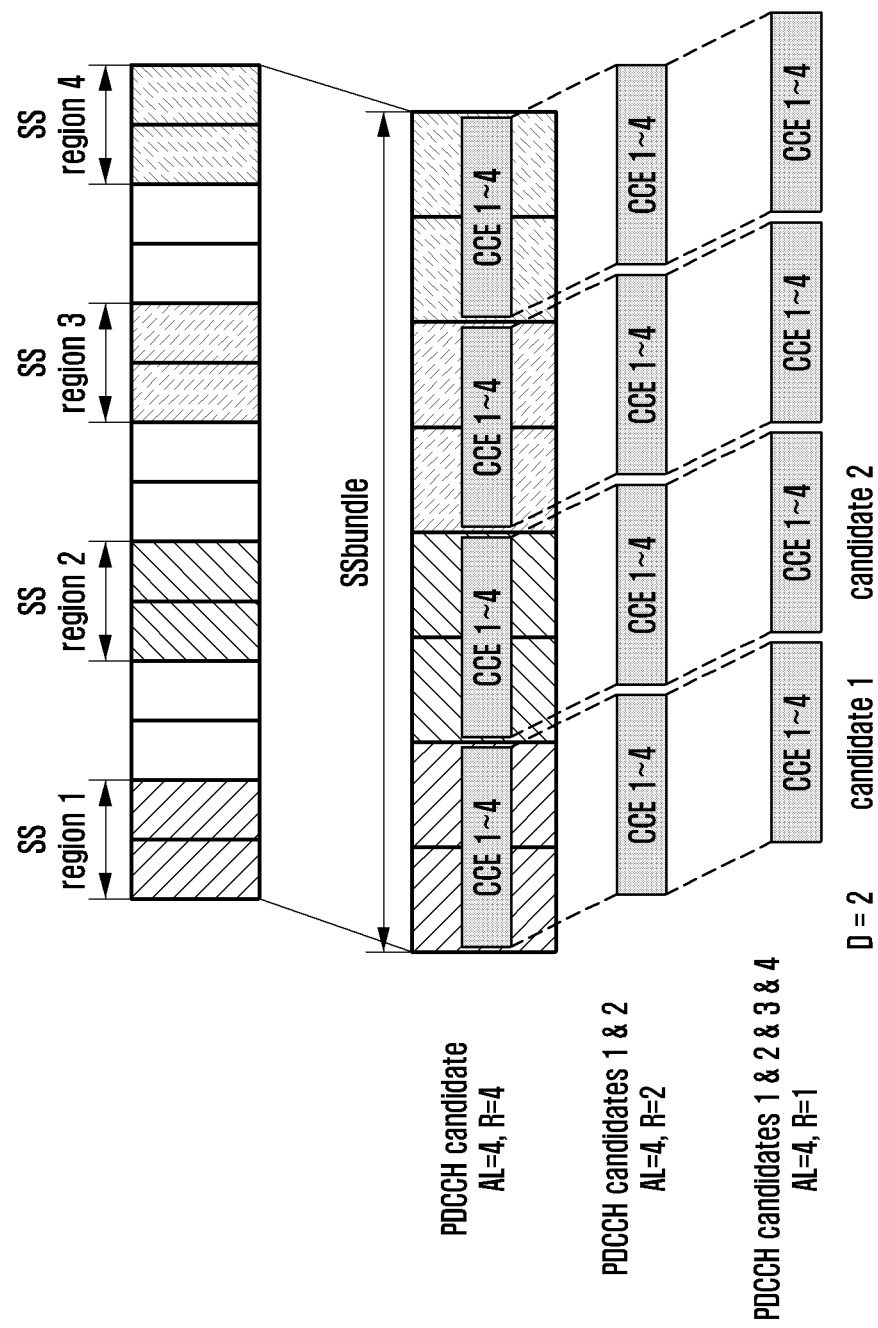
FIG. 22 shows an exemplary schematic diagram of determining a position of a PDCCH candidate in a method for determining an SS based on repeated PDCCH.

According to an exemplary determination method, in an SS-bundle, starting from the first SS region, the position of each PDCCH candidate is determined based on the number of repetitions R_r, where, starting from the first PDCCH candidate, the positions of D PDCCH candidates are determined, and the D PDCCH candidates are continuous. D is configured by the base station or predefined by standard. For example, an SS-bundle includes Rmax SS regions, and the starting point of PDCCH candidates with the number of repetitions R_r is located in the first, R_r+1, . . . 2*R_r+1 SS region. As shown in FIG. 22, 4 adjacent SS regions are determined as an SS-bundle according to Rmax=4, and the value range of R_r is 1, 2 or 4. When the R_r value of a PDCCH candidate is 1, the starting point may be any of the 4 SS regions of the SS-bundle. When the R_r value of a PDCCH candidate is 2, the starting point may be the first SS region of the SS-bundle or the third SS region of the SS-bundle. When the R_r value of a PDCCH candidate is 4, the starting point is the first SS region of the SS-bundle Assuming that the base station configures D=1 of PDCCH candidates with R_r=1, the UE only needs to detect the position of PDCCH candidates mapped to SS region 1 starting from SS region 1. If D=2 of PDCCH candidates with R_r=1, the UE only needs to detect the position of PDCCH candidates mapped to SS region 1 starting from SS region 1 and the position of PDCCH candidates mapped to SS region 2 starting from SS region 2.

Figure 23:
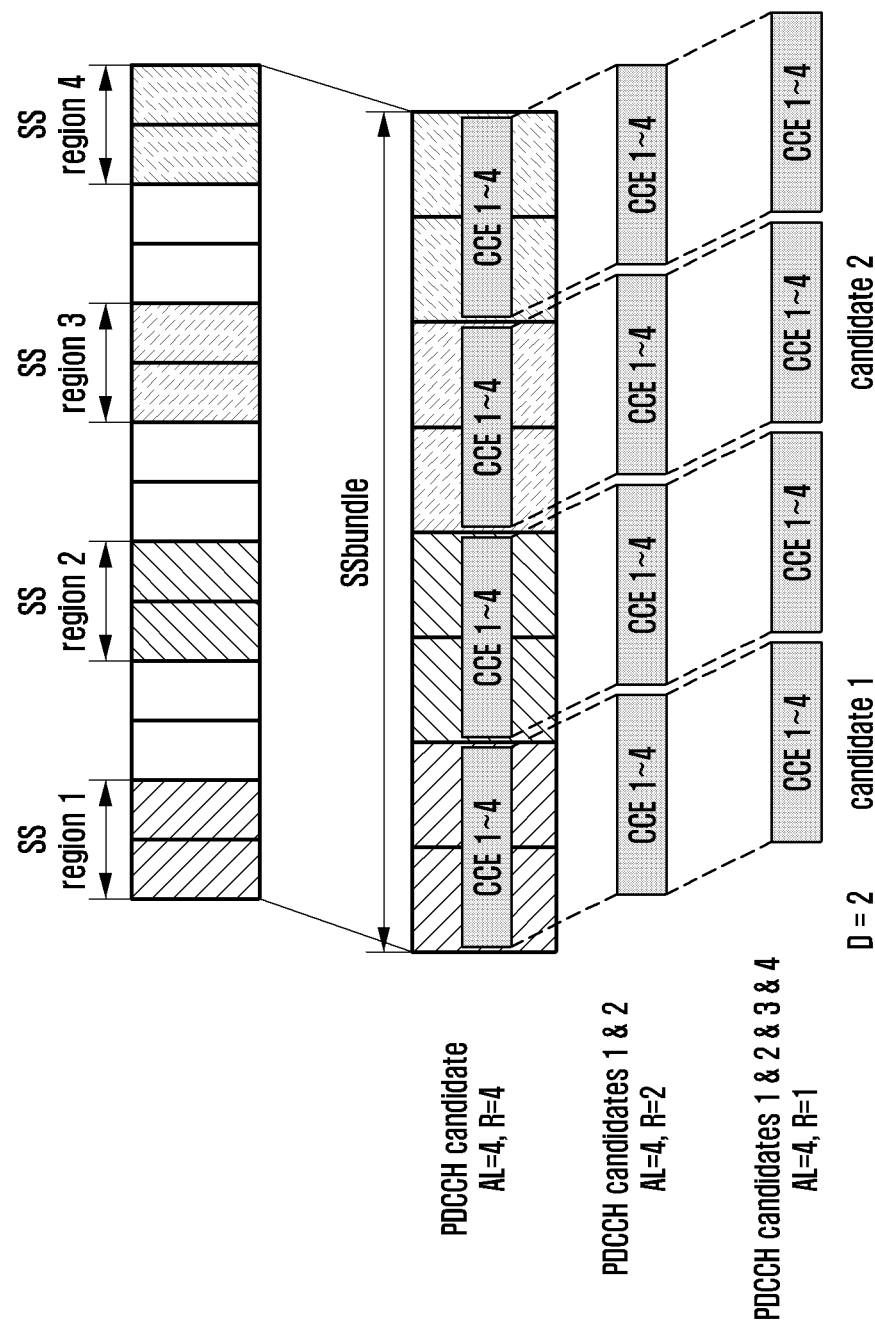
FIG. 23 shows an exemplary schematic diagram of determining a position of a PDCCH candidate in a method for determining an SS based on repeated PDCCH.

According to another exemplary determination method, in an SS-bundle, starting from the first SS region, the position of each PDCCH candidate is determined based on the number of repetitions R_r, where, starting from the first PDCCH candidate, the positions of D PDCCH candidates are determined, and the D PDCCH candidates are discontinuous. In this example, the distance between adjacent PDCCH candidates is as far as possible. For example, for PDCCH candidates with R_r=1, there are 4 candidate positions in an SS-bundle. As shown in FIG. 23, when D=2, the positions of the PDCCH candidates to be detected by the UE are the first and third candidate positions in sequence. The mapping method according to this example may reduce PDCCH blocking to some extent. The base station may allocate and configure the most suitable mapping method according to different CORESET or SS application scenarios.

Alternatively, according to an exemplary embodiment, when configuring a CORESET or SS, the base station configures the number of repetitions that it can support. Further, when configuring a CORESET or SS, the base station configures a combination of the number of repetitions and the AL. If the base station configures a plurality of CORESETs or SSs for the UE, the base station configures for the plurality of CORESETs or SSs respectively, which may support different numbers of repetitions of CORESETs or SSs and different combinations with ALs.

Alternatively, when configuring a CORESET or SS, the base station configures a method for determining an SS based on repeated PDCCH.

The above communication method of the present disclosure is described from the perspective of the UE.

Correspondingly, according to another aspect of the present disclosure, a communication method performed by the base station includes: sending configuration information of a PDCCH by the base station, where, the configuration information can be used to determine mapping information on a mapping relationship between a CCE and a REG and a mapping relationship between a CCE and a REG mapped to an SS region in an SS-bundle by the UE; and sending the PDCCH based on the mapping information determined from the configuration information of the PDCCH by the base station, where the mapping from the CCE to the REG of the PDCCH and the mapping from the REG/CCE to the SS region are determined based on the configuration information.

Further, based on the received PDCCH, the UE also determines resource information for receiving a physical downlink shared channel (PDSCH).

Determination of Starting Point of PDSCH

When the UE receives a PDSCH, it usually needs to receive a PDCCH first, and determines resource information of the PDSCH according to an indication of the PDCCH, for example, the slot where the PDSCH is located, an OFDM symbol index in the slot, and the symbol length.

According to an aspect of the present disclosure, a method for selecting a reference time point and/or determining a slot and/or symbol where the PDSCH is located is also proposed when the number of repetitions of the PDCCH scheduling the PDSCH is R>1.

According to an embodiment of the present disclosure, the slot where the last symbol of the $R^{th}$ transmission of the PDCCH is located is used as a reference time, and the slot where the PDSCH is located is determined based on a slot offset K0 indicated in the PDCCH. For example, the repetition number of PDCCH is R=4, which are located in the first 3 symbols of slot n, the last 3 symbols of slot n, the first 3 symbols of slot n+1, and the last 3 symbols of slot n+1. Then, based on the position of the fourth PDCCH, it is determined to receive the PDSCH in slot n+1+K0 referring to the starting point of slot n+1. Or, the starting point of the slot where the first symbol of the $R^{th}$ transmission of the PDCCH is located is used as the reference time. In order to avoid the UE's misunderstanding of the value of R, the base station may display or implicitly indicate the value of R. For example, the value of R may be indicated in DCI. Different PDCCH starting points or different scrambling codes, etc. may be determined according to different Rs.

According to another embodiment of the present disclosure, the slot where the starting point or ending point of the last symbol of a PDCCH candidate determined according to Rmax is the reference time. For example, Rmax=4, the time resource of the PDCCH candidate determined according to Rmax is respectively located in the first 3 symbols of slot n, the last 3 symbols of slot n, the first 3 symbols of slot n+1, and the last 3 symbols of slot n+1. The actual number of repetitions of the PDCCH is 2, which is located in the first 3 symbols of slot n and the last 3 symbols of slot n. According to the position of the fourth PDCCH, the starting point of slot n+1 is determined as the reference, and the PDSCH is received in slot n+1+K0. The advantage of this method is that, regardless of whether the UE correctly obtains the value of R, the UE may determine the reference slot without error.

According to another aspect of the present disclosure, the ending position of the last symbol of the $R^{th}$ transmission of the PDCCH, or the ending position of the first symbol of the $R^{th}$ transmission of the PDCCH, or the ending position of the last symbol of a PDCCH candidate determined according to Rmax, or the ending position of the first symbol of the Rmax repeated samples of a PDCCH candidate determined according to Rmax is used as a symbol level reference. Alternatively, the UE does not expect the starting symbol of the PDSCH to be earlier than the reference symbol. This has the advantage that the UE does not need to store a large number of downlink signals before deciphering the PDCCH, and only needs to start storing downlink signals before and after the last repetition of the PDCCH for receiving the PDSCH.

The present disclosure also discloses a base station and a UE that are suitable for implementing the communication method of the present disclosure.

Figure 24:
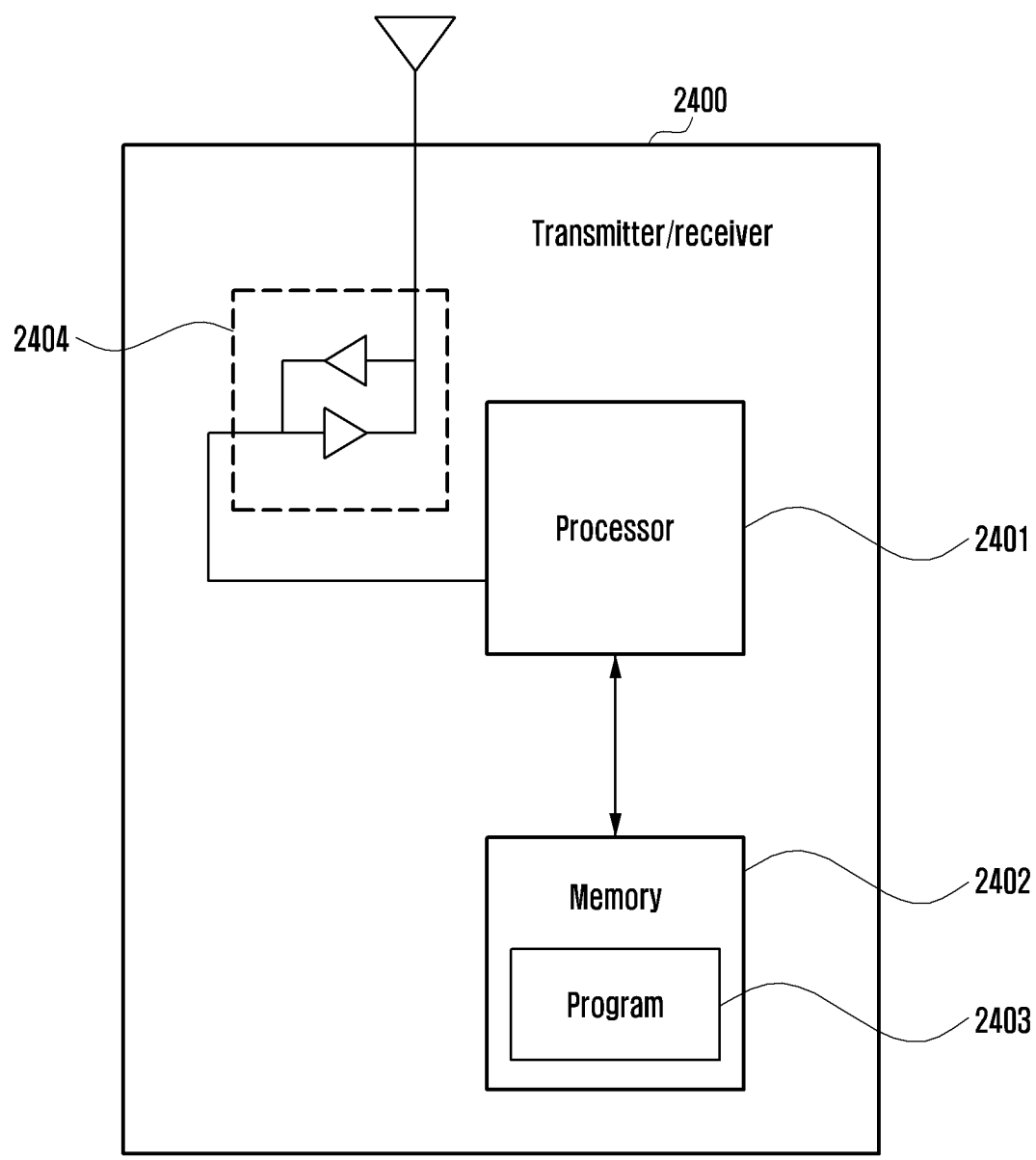
FIG. 24 shows a simplified block diagram of a physical apparatus suitable for practicing the present disclosure.

FIG. 24 shows a simplified block diagram of an entity 2400 suitable for practicing many exemplary embodiments of the present disclosure. The entity 2400 may be configured as a network-side device, such as a base station, and the entity 2400 may also be configured as a user-side device, such as a user equipment UE.

As shown in FIG. 24, the entity 2400 includes a processor 2401, a memory 2402 coupled to the processor 2401, and a suitable radio frequency (RF) transmitter and receiver 2404 coupled to the processor 2401. The memory 2402 stores a program 2403. The transmitter/receiver 2404 is suitable for two-way wireless communication. It should be noted that the transmitter/receiver 2404 has at least one antenna to assist communication, and in practice the base station or the UE may have a plurality of antennas. The entity 2400 may be coupled to one or more external networks or systems via a data path, such as the Internet.

The program 2403 may include program instructions, these program instructions, when executed by the associated processor 2401, cause the entity 2400 to operate according to the exemplary embodiments of the present disclosure.

The embodiments of the present disclosure may be implemented by computer software executable by the processor 2401 of the entity 2400, or by hardware, or by a combination of software and hardware.

The memory 2402 may be any suitable type of memory suitable for a local technical environment, and may be implemented using any suitable data storage technology, such as semiconductor-based storage devices and systems, magnetic storage devices and systems, optical storage devices and systems, fixed memories and removable memories, these are only non-limiting examples. Although only one memory is shown in the entity 2400, there may be a plurality of physically independent storage units in the entity 2400. The processor 2401 may be any suitable type of processor suitable for the local technical environment, and may include one or more of the following: general-purpose computer, dedicated computer, microprocessor, digital signal processor (DSP), and multi-core processor architecture-based processor, these are only non-limiting examples.

When the entity 2400 is configured as a network-side device, that is, when the entity 2400 is a base station, in some embodiments, the transmitter in the transmitter/receiver 2404 is configured to be under the control of the processor 2401 to send the PDCCH to the UE according to various embodiments of the present disclosure.

The transmitter in the transmitter/receiver 2404 is further configured to receive information sent by the UE based on the received PDCCH under the control of the processor 2401.

When the entity 2400 is configured as a user-side device, that is, when the entity 2400 is a UE, in some embodiments, the receiver in the transmitter/receiver 2404 is configured to receive the PDCCH from the base station under the control of the processor 2401.

The transmitter in the transmitter/receiver 2404 is configured to transmit information based on the received PDCCH.

It should be understood that the units included in the entity 2400 are configured to practice the exemplary embodiments disclosed herein. Therefore, the operations and features described above in connection with FIGS. 17-23 are also applicable to the entity 2400 and the units therein, and detailed description thereof will be omitted.

Further, it should also be understood that although the present disclosure has been described with the UE receiving the PDCCH from the base station as an example, it is not limited to the case where the UE is the receiver and the base station is the transmitter. Alternatively, in some embodiments, a first base station may also receive the PDCCH from a second base station according to the technical solution of the present disclosure. In this case, the first base station as the receiver performs the operation of the UE described in the present disclosure, and the second base station as the transmitter performs the operation of the base station described in the present disclosure. As another option, in some embodiments, the PDCCH may also be received by a first UE from a second UE according to the technical solution of the present disclosure. In this case, the first UE as the receiver performs the operation of the UE described in the present disclosure, and the second UE as the transmitter performs the operation of the base station described in the present disclosure. That is, the PDCCH receiver of the technical solution described in the present disclosure is not limited to the UE, nor is the PDCCH transmitter limited to the base station. The embodiments of the present disclosure may be applied as long as it is a scenario where one party needs to receive the PDCCH from the other party.

As another aspect, the present disclosure also provides a computer readable storage medium. The computer readable storage medium may be a computer readable storage medium included in the base station or the communication device in the foregoing embodiments; or a stand-alone computer readable storage medium not assembled into the device. The computer readable storage medium stores one or more programs. The program, when executed by one or more processors, perform the communication method described in the present disclosure.

The above description is only the preferred embodiment of the present disclosure and the explanation of the applied technical principles. Those skilled in the art should understand that the scope of the invention involved in the present disclosure is not limited to the technical solution formed by the specific combination of the above technical features, but should also cover other technical solutions formed by any combination of the above technical features or their equivalent features without departing from the inventive concept. For example, a technical solution formed by replacing the above features with technical features disclosed in the present disclosure (but not limited to) but having similar functions.

The above description is only part of the implementation of the present disclosure. It should be noted that those of ordinary skill in the art may make several improvements and retouches without departing from the principles of the present disclosure. These improvements and retouches are also regarded as falling within the protection scope of this disclosure.

The invention claimed is:

1. A method performed by a terminal in a wireless communication system, the method comprising:
  receiving, from a base station, configuration information for a physical downlink control channel (PDCCH);
  identifying a plurality of PDCCH monitoring occasions for PDCCH repetitions based on the configuration information; and
  monitoring at least one PDCCH scheduling a physical downlink shared channel (PDSCH) based on the plurality of PDCCH monitoring occasions,
  wherein the plurality of PDCCH monitoring occasions includes a first PDCCH monitoring occasion corresponding to a first search space (SS) and a second PDCCH monitoring occasion corresponding to a second SS,
  wherein the first SS and the second SS are associated with each other, and
  wherein the first SS and the second SS have a same SS type that is one of a user equipment specific SS (USS) or a common SS (CSS).

2. The method of claim 1, further comprising receiving, from the base station, information indicating whether a same beam is used for the at least one PDCCH in the first PDCCH monitoring occasion and the second PDCCH monitoring occasion,
   wherein in case that the information does not indicate that the same beam is used, the at least one PDCCH is monitored based on different beams.

3. The method of claim 1,
   wherein the first SS is associated with a first control resource set (CORESET), and
   wherein the second SS is associated with a second CORESET.

4. The method according to claim 1,
   wherein the first SS and the second SS have a same periodicity, a same offset, and a same duration in a time domain.

5. The method of claim 1, further comprising:
   receiving, from the base station, uplink (UL)/downlink (DL) configuration;
   receiving, from the base station, downlink control information (DCI) including a slot format indicator (SFI);
   identifying a valid resource of the PDCCH monitoring occasions based on the UL/DL configuration and the SFI; and
   monitoring the at least one PDCCH based on the valid resource.

6. A terminal in a wireless communication system, the terminal comprising:
   a transceiver; and
   a processor operably coupled to the transceiver, wherein the processor is configured to:
      receive, from a base station, configuration information for a physical downlink control channel (PDCCH),
      identify a plurality of PDCCH monitoring occasions for PDCCH repetitions based on the configuration information, and
      monitor at least one PDCCH scheduling a physical downlink shared channel (PDSCH) based on the plurality of PDCCH monitoring occasions,
   wherein the plurality of PDCCH monitoring occasions includes a first PDCCH monitoring occasion corresponding to a first search space (SS) and a second PDCCH monitoring occasion corresponding to a second SS,
   wherein the first SS and the second SS are associated with each other, and
   wherein the first SS and the second SS have a same SS type that is one of a user equipment specific SS (USS) or a common SS (CSS).

7. The terminal of claim 6, wherein the processor is further configured to receive, from the base station, information indicating whether a same beam is used for the at least one PDCCH in the first PDCCH monitoring occasion and the second PDCCH monitoring occasion, and
   wherein in case that the information does not indicate that the same beam is used, the at least one PDCCH is monitored based on different beams.

8. The terminal of claim 6,
   wherein the first SS is associated with a first control resource set (CORESET), and
   wherein the second SS is associated with a second CORESET.

9. The terminal of claim 6,
   wherein the first SS and the second SS have a same periodicity, a same offset, and a same duration in a time domain.

10. The terminal of claim 6, wherein the processor is further configured to:
    receive, from the base station, uplink (UL)/downlink (DL) configuration;
    receive, from the base station, downlink control information (DCI) including a slot format indicator (SFI);
    identify a valid resource of the PDCCH monitoring occasions based on the UL/DL configuration and the SFI; and
    monitor the at least one PDCCH based on the valid resource.

11. A method performed by a base station in a wireless communication system, the method comprising:
    transmitting, to a terminal, configuration information for a physical downlink control channel (PDCCH), wherein a plurality of PDCCH monitoring occasions for PDCCH repetitions is configured based on the configuration information, and wherein the plurality of PDCCH monitoring occasions includes a first PDCCH monitoring occasion corresponding to a first search space (SS) and a second PDCCH monitoring occasion corresponding to a second SS; and
    transmitting, to the terminal, at least one PDCCH scheduling a physical downlink shared channel (PDSCH) based on the plurality of PDCCH monitoring occasions,
    wherein the first SS and the second SS are associated with each other, and
    wherein the first SS and the second SS have a same SS type that is one of a user equipment specific SS (USS) or a common SS (CSS).

12. The method of claim 11, further comprising transmitting, to the terminal, information indicating whether a same beam is used for the at least one PDCCH in the first PDCCH monitoring occasion and the second PDCCH monitoring occasion,
    wherein in case that the information does not indicate that the same beam is used, the at least one PDCCH is based on different beams.

13. The method of claim 11,
    wherein the first SS is associated with a first control resource set (CORESET), and
    wherein the second SS is associated with a second CORESET.

14. The method of claim 11,
    wherein the first SS and the second SS have a same periodicity, a same offset, and a same duration in a time domain.

15. The method of claim 11, further comprising:
    transmitting, to the terminal, uplink (UL)/downlink (DL) configuration; and
    transmitting, to the terminal, downlink control information (DCI) including a slot format indicator (SFI),
    wherein a valid resource of the plurality of PDCCH monitoring occasions for the at least one PDCCH is associated with the UL/DL configuration and the SFI.

16. A base station in a wireless communication system, the base station comprising:
    a transceiver; and
    a processor operably coupled to the transceiver, wherein the processor is configured to:
       transmit, to a terminal, configuration information for a physical downlink control channel (PDCCH), wherein a plurality of PDCCH monitoring occasions for PDCCH repetitions is configured based on the configuration information, and wherein the plurality of PDCCH monitoring occasions includes a first PDCCH monitoring occasion corresponding to a first search space (SS) and a second PDCCH monitoring occasion corresponding to a second SS, and transmit, to the terminal, at least one PDCCH scheduling a physical downlink shared channel (PDSCH) based on the plurality of PDCCH monitoring occasions, wherein the first SS and the second SS are associated with each other, and wherein the first SS and the second SS have a same SS type that is one of a user equipment specific SS (USS) or a common SS (CSS).

17. The base station of claim 16, wherein the processor is further configured to transmit, to the terminal, information indicating whether a same beam is used for the at least one PDCCH in the first PDCCH monitoring occasion and the second PDCCH monitoring occasion, and wherein in case that the information does not indicate that the same beam is used, the at least one PDCCH is based on different beams.

18. The base station of claim 16, wherein the first SS is associated with a first control resource set (CORESET), and wherein the second SS is associated with a second CORESET.

19. The base station of claim 16, wherein the first SS and the second SS have a same periodicity, a same offset, and a same duration in a time domain.

20. The base station of claim 16, wherein the processor is further configured to:

transmit, to the terminal, uplink (UL)/downlink (DL) configuration, and transmit, to the terminal, downlink control information (DCI) including a slot format indicator (SFI), wherein a valid resource of the plurality of PDCCH monitoring occasions for the at least one PDCCH is associated with the UL/DL configuration and the SFI.

* * * * *